US011621974B2

United States Patent
Sexton et al.

(10) Patent No.: US 11,621,974 B2
(45) Date of Patent: Apr. 4, 2023

(54) MANAGING SUPERSEDENCE OF SOLUTIONS FOR SECURITY ISSUES AMONG ASSETS OF AN ENTERPRISE NETWORK

(71) Applicant: Tenable, Inc., Columbia, MD (US)

(72) Inventors: Katherine Alice Sexton, Glen Rock, PA (US); Nicholas Miles, Georgetown, KY (US); Nicolas Pouvesle, Seattle, WA (US); Renaud Deraison, New York, NY (US); Clint Merrill, Hillsboro, OR (US); John Walker, Denver, CO (US); Charles Joseph Bacon, Oviedo, FL (US)

(73) Assignee: TENABLE, INC., Columbia, MD (US)

( * ) Notice: Subject to any disclaimer, the term of this patent is extended or adjusted under 35 U.S.C. 154(b) by 359 days.

(21) Appl. No.: 16/874,087

(22) Filed: May 14, 2020

(65) Prior Publication Data

US 2020/0366706 A1 Nov. 19, 2020

Related U.S. Application Data

(60) Provisional application No. 62/847,685, filed on May 14, 2019.

(51) Int. Cl.
*H04L 9/40* (2022.01)
(52) U.S. Cl.
CPC ...... *H04L 63/1433* (2013.01); *H04L 63/1425* (2013.01)
(58) Field of Classification Search
CPC .............. H04L 63/1433; H04L 63/1425
See application file for complete search history.

(56) References Cited

U.S. PATENT DOCUMENTS 9,088,615 B1   7/2015  Avlasov et al.
9,117,069 B2 *  8/2015  Oliphant ................. H04L 63/20
(Continued)

FOREIGN PATENT DOCUMENTS

CN      111142740 A  *  5/2020
CN      111683055 A  *  9/2020
(Continued)

OTHER PUBLICATIONS

Zhang, M. et al., "AppSealer: Automatic Generation of Vulnerability-Specific Patches for Preventing Component Hijacking Attacks in Android Applications" NDSS '14, Feb. 23-26, 2014, San Diego, CA, USA Copyright 2014 Internet Society, ISBN 1-891562-35-5, http://dx.doi.org/10.14722/ndss.2014.23255.

Primary Examiner — Sarah Su
(74) Attorney, Agent, or Firm — Muncy, Geissler, Olds & Lowe, P.C.; Daniel Podhajny

(57) ABSTRACT

In an embodiment, a security auditing component obtains a solution set that is based upon a security audit of an enterprise network, the solution set characterizing a set of solutions associated with a set of security issues associated with one or more assets of the enterprise network, detects that the solution set can be condensed into a condensed solution set that mitigates the set of security issues to the same degree as the solution set, the detection being based at least in part upon (i) one or more rules applied to one or more solution texts and/or (ii) asset-specific metadata and/or (iii) static metadata, and condenses, based on the detecting, the solution set into the condensed solution set by combining two or more subsets of related solutions and/or filtering the solution set to remove one or more subsets of redundant or superseded solutions.

30 Claims, 12 Drawing Sheets

(56) References Cited

U.S. PATENT DOCUMENTS

| | | | | |
|---|---|---|---|---|
| 9,225,686 | B2* | 12/2015 | Oliphant | H04L 63/02 |
| 2010/0250476 | A1 | 9/2010 | Khoury et al. | |
| 2010/0306845 | A1* | 12/2010 | Vaithilingam | H04L 51/212 |
| | | | | 709/206 |
| 2016/0315961 | A1* | 10/2016 | Duer | H04L 63/1433 |
| 2017/0272452 | A1 | 9/2017 | Kraemer et al. | |
| 2019/0342323 | A1 | 11/2019 | Henderson et al. | |
| 2020/0162503 | A1* | 5/2020 | Shurtleff | H04L 41/0883 |
| 2021/0211453 | A1* | 7/2021 | Cooney | G06F 21/577 |
| 2021/0367961 | A1* | 11/2021 | Kuppa | G06N 20/00 |
| 2021/0400074 | A1* | 12/2021 | Smith | H04L 63/1433 |
| 2022/0166789 | A1* | 5/2022 | Murray | H04L 63/20 |
| 2022/0229669 | A1* | 7/2022 | Sheridan | G06F 9/30007 |
| 2022/0272115 | A1* | 8/2022 | McParland | H04L 63/1433 |

FOREIGN PATENT DOCUMENTS

| | | | | |
|---|---|---|---|---|
| CN | 111770097 A * | 10/2020 | | H04L 63/0227 |
| CN | 112532596 A * | 3/2021 | | |
| EP | 3267348 A1 * | 1/2018 | | G06F 21/55 |
| WO | WO-2009119049 A1 * | 10/2009 | | G06F 21/554 |

* cited by examiner

MANAGING SUPERSEDENCE OF SOLUTIONS FOR SECURITY ISSUES AMONG ASSETS OF AN ENTERPRISE NETWORK

CROSS-REFERENCE TO RELATED APPLICATIONS

The present application claims the benefit of U.S. Provisional Patent Application No. 62/847,685, entitled "MANAGING SUPERSEDENCE OF SOLUTIONS FOR SECURITY ISSUES AMONG ASSETS OF AN ENTERPRISE NETWORK," filed May 14, 2019, the contents of which are hereby incorporated by reference in their entirety.

TECHNICAL FIELD

The various aspects and embodiments described herein generally relate to managing supersedence of solutions for security issues among assets of an enterprise network.

BACKGROUND

With increasing threats and a constantly changing information technology (IT) landscape, security teams today can barely keep up with the pace of identifying vulnerabilities and threats and, more importantly, fixing them. Furthermore, as more and more organizations embrace virtualization, the cloud, mobile, and collaboration and communication among software development and IT operations (sometimes called "DevOps"), the fundamental concept of an asset changes and radically impacts how and when organizations and security teams need to assess vulnerabilities.

One factor to asset-specific vulnerability assessments is a degree of threat associated with software vulnerabilities. Conventionally, assessing the degree of threat associated with software vulnerabilities is a manual and somewhat subjective process that attempts to rank software vulnerabilities by their associated degree of threat, and then allocate resources to fixing or remediating those software vulnerabilities in accordance with the rankings. More recently, algorithms for automatically predicting exploit development for particular software vulnerabilities have been developed, such as those described in U.S. application Ser. No. 15/827,943, entitled "EXPLOIT PREDICTION BASED ON MACHINE LEARNING". Such algorithms rely upon software vulnerability prevalence (i.e., the raw number of assets impacted by the respective software vulnerabilities) as a primary parameter for exploit development prediction.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In an embodiment, a security auditing component obtains a solution set that is based upon a security audit of an enterprise network, the solution set characterizing a set of solutions associated with a set of security issues associated with one or more assets of the enterprise network, detects that the solution set can be condensed into a condensed solution set that mitigates the set of security issues to the same degree as the solution set, the detection being based at least in part upon (i) one or more rules applied to one or more solution texts and/or (ii) asset-specific metadata, and/or (iii) static metadata, and condenses, based on the detecting, the solution set into the condensed solution set by combining two or more subsets of related solutions and/or filtering the solution set to remove one or more subsets of redundant or superseded solutions.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
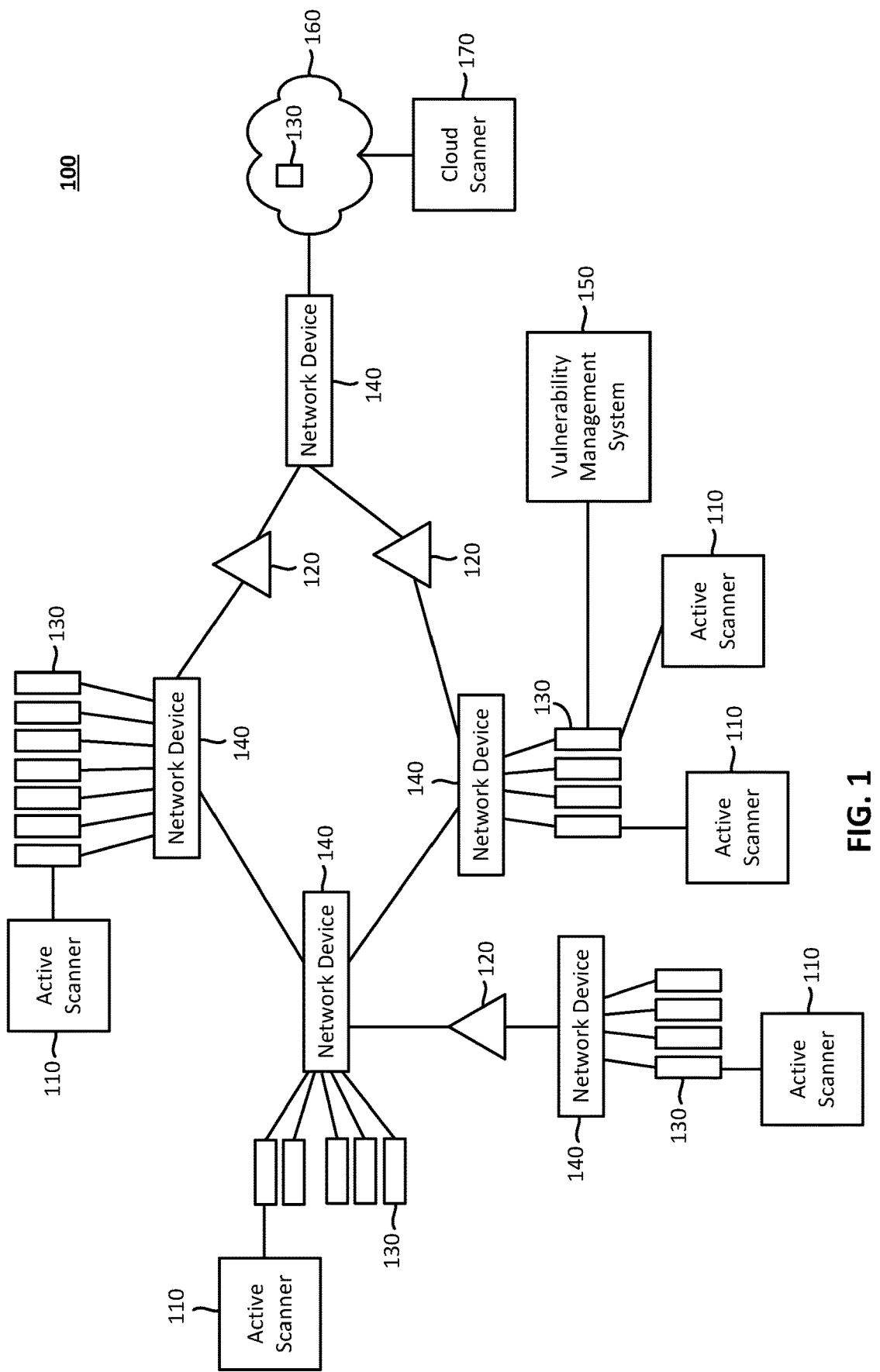
FIG. 1 illustrates an exemplary network having various assets that can be managed using a vulnerability management system, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), etc.). For example, the various aspects and embodiments described herein contemplate that an asset may be a physical electronic object such as, without limitation, a desktop computer, a laptop computer, a server, a storage device, a network device, a phone, a tablet, a wearable device, an Internet of Things (IoT) device, a set-top box or media player, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof. Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes.

A plugin of the system or of an application of the system may contain logic and metadata for an individual security check in a security auditing application. A plugin may check for one or more mitigations/fixes and flag one or more individual security issue. A plugin may generally describe an integrated or partially integrated piece of software for an application. A logic method includes logic used to compare two missing patches/updates to see if one supersedes the other. For example, the logic method may be a version comparison, a RPM comparison (where RPM stands for Red Hat Package Manager), or a custom Microsoft KB supersedence mapping. A logic object may be an OOP object unique to each logic method which contains the variables and functions necessary to apply the logic method and determine supersedence. The relationship between the logic object and the logic method may be, for example, a logic object of "patch: logic_ver_comp" for the "Version comparison" logic method and a logic object of "patch: logic_rpm_cmp" for the "RPM comparison" method.

Supersedence for software patches is the concept of a hierarchy of patches where applying a higher-level patch also mitigates the vulnerabilities of patches that are lower in the supersedence hierarchy. The comparability of missing patches and the logic used to compare them for supersedence varies by product. In accordance with some scanning protocols, patches or updates are only compared for supersedence if they are missing from the target host. Plugins may only check for security-related patches or updates.

A product family is a high-level grouping of more specific products, e.g., Microsoft Word is a product family of Word 2007, Word 2010, etc. In some cases, all products in a product family may use the same logic method. For local package checks, the product family is the package manager. A logic method handler is a function of a logic object, which takes two missing patch or update references as input and determines if one supersedes the other using the associated logic method. For example, patch::logic_ver_comp.compare_findings( ) patch::logic_rpm_cmp.compare findings( ) are comparison functions for version and RPM logic methods. A product is a specific branch or edition of a product family, e.g. Word 2007. Even more specifically, an installation is an instance of a particular product on a host. A finding is a missing patch or update for a particular installation which may be discovered by the logic method handler and may be used as a data point for supersedence calculation. For example, a missing update 52.3 for installation 1, or a missing patch KB123456 for installation 2 are findings. A CVE identifier is an identifier from a national database maintained by NIST or MITRE which keeps a list of known vulnerabilities and exposures. An example identifier would be "CVE-2014-6271" which corresponds to the "ShellShock" vulnerability.

According to various aspects, FIG. 1 illustrates an exemplary network 100 having various assets 130 that are interconnected via one or more network devices 140 and managed using a vulnerability management system 150. More particularly, as noted above, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

According to various aspects, the assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. As will be apparent to those skilled in the art, the diverse nature of the various assets 130 make the network 100 substantially dynamic and without clear boundaries, whereby the attack surface may expand and contract over time in an often unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations. Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility, BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived assets like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100.

More particularly, the network 100 may include one or more active scanners 110 configured to communicate packets or other messages within the network 100 to detect new or changed information describing the various network devices 140 and other assets 130 in the network 100. For example, in one implementation, the active scanners 110 may perform credentialed audits or uncredentialed scans to scan certain assets 130 in the network 100 and obtain information that may then be analyzed to identify potential vulnerabilities in the network 100. More particularly, in one implementation, the credentialed audits may include the active scanners 110 using suitable authentication technologies to log into and obtain local access to the assets 130 in the network 100 and perform any suitable operation that a local user could perform thereon without necessarily requiring a local agent. Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.). On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In one implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic, wherein the reconstructed sessions may then be used in combination with the information obtained with the active scanners 110 to build a model or topology describing the network 100. For example, in one implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In one implementation, the passive scanners 120 may further apply various signatures to the information in the observed traffic to identify vulnerabilities in the network 100 and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In one implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In one implementation, the passive scanners 120 may observe as many sessions in the network 100 as possible to provide optimal visibility into the network 100 and the activity that occurs therein. For example, in one implementation, the passive scanners 120 may be deployed at any suitable location that enables the passive scanners 120 to observe traffic going into and/or out of one or more of the network devices 140. In one implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in one implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
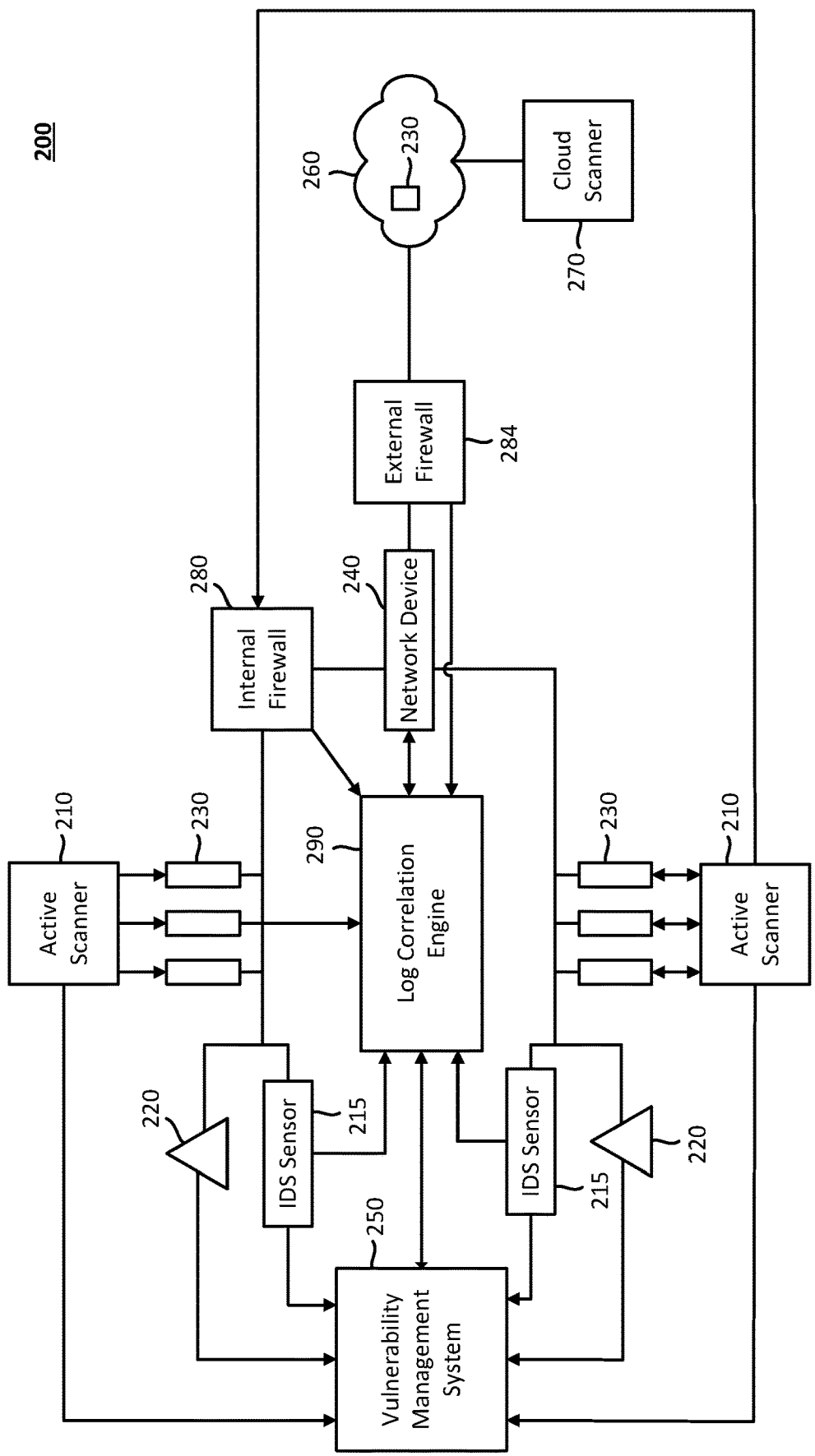
FIG. 2 illustrates another exemplary network having various assets that can be managed using a vulnerability management system, according to various aspects.

According to various aspects, FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in one implementation, the network 200 may include one or more active scanners 210 and/or cloud scanners 270, which may interrogate assets 230 in the network 200 to build a model or topology of the network 200 and identify various vulnerabilities in the network 200, one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in one implementation, a log correlation engine 290 may be arranged to receive logs containing events from various sources distributed across the network 200. For example, in one implementation, the logs received at the log correlation engine 290 may be generated by internal firewalls 280, external firewalls 284, network devices 240, assets 230, operating systems, applications, or any other suitable resource in the network 200. Accordingly, in one implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In one implementation, the active scanners 210 may be strategically distributed in locations across the network 200 to reduce stress on the network 200. For example, the active scanners 210 may be distributed at different locations in the network 200 in order to scan certain portions of the network 200 in parallel, whereby an amount of time to perform the active scans may be reduced. Furthermore, in one implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260, wherein the term "remote network" as used herein may refer to the Internet, a partner network, a wide area network, a cloud infrastructure, and/or any other suitable external network. As such, the terms "remote network," "external network," "partner network," and "Internet" may all be used interchangeably to suitably refer to one or more networks other than the networks 100, 200 that are managed using the vulnerability management systems 150, 250, while references to "the network" and/or "the internal network" may generally refer to the areas that the systems and methods described herein may be used to protect or otherwise manage. Accordingly, in one implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may scan limited portions of the network 200 and/or offload scanning responsibility to the cloud scanners 270, and because the parallel active scans may obtain information from the different portions of the network 200, the overall amount of time that the active scans consume may substantially correspond to the amount of time associated with one active scan.

As such, in one implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In one implementation, in response to obtaining the snapshot of the network 200, the active scanners 210 and/or cloud scanners 270 may then report the information describing the snapshot to the vulnerability management system 250, which may use the information provided by the active scanners 210 to remediate and otherwise manage the vulnerabilities and assets in the network.

Furthermore, in one implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in one implementation, the passive scanners 220 may monitor the traffic traveling across the network 200 and the traffic originating from and/or directed to the remote network 260 to identify vulnerabilities, assets, or information that the active scanners 210 may be unable to obtain because the traffic may be associated with previously inactive assets that later participate in sessions on the network. Additionally, in one implementation, the passive scanners 220 may be deployed directly within or adjacent to an intrusion detection system sensor 215, which may provide the passive scanners 220 with visibility relating to intrusion events or other security exceptions that the intrusion detection system (IDS) sensor 215 identifies. In one implementation, the IDS may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network 200. In one implementation, the information that the passive scanners 220 obtains from sniffing the traffic traveling across, originating from, or directed to the network 200 may therefore provide a real-time record describing the activity that occurs in the network 200. Accordingly, in one implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In one implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In one implementation, the log correlation engine 290 may normalize the events contained in the various logs received from the sources distributed across the network 200, and in one implementation, may further aggregate the normalized events with information describing the snapshot of the network 200 obtained by the active scanners 210 and/or the network traffic observed by the passive scanners 220. Accordingly, in one implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and assets in the network 200.

Furthermore, in one implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or the activity observed by the passive scanners 220 to comprehensively monitor, remediate, and otherwise manage the vulnerabilities and assets in the network 200. Additionally, in one implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and the cloud scanners 270 to remediate or manage the network 200.

Accordingly, in various embodiments, the active scanners 210 and/or cloud scanners 270 may interrogate any suitable asset 230 in the network 200 to obtain information describing a snapshot of the network 200 at any particular point in time, the passive scanners 220 may continuously or periodically observe traffic traveling in the network 200 to identify vulnerabilities, assets, or other information that further describes the network 200, and the log correlation engine 290 may collect additional information to further identify the vulnerabilities, assets, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage the network 200.

Security auditing applications typically display security issues (such as vulnerabilities, security misconfigurations, weaknesses, etc.) paired with a particular solution for that given issue. Certain security issues may share a given solution or have solutions which are superseded or otherwise rendered unnecessary by other reported solutions. Embodiments of the disclosure relate to improving an efficiency by which security issues are reported, managed and/or rectified based on solution supersedence.

In accordance with a first embodiment, when working with security reporting datasets with sparse metadata available, the reported solutions for each security issue are combined, and various "rulesets" are applied against the combined solutions to de-duplicate them and remove solutions that have been superseded by other solutions. As used herein, a ruleset is a set of rules that govern when a solution is to be removed or merged with another and how that merge is to be accomplished. In an example, when solution texts not matching a given ruleset are discovered they are flagged for manual review. Examples of rules that may be included in one or more rulesets are as follows:
  If there is more than one matching solution in the solution list, remove all but one of those solutions.
  For solutions matching "Upgrade to <product>x.y.z" where x, y, and z are integers, select a single result with the highest x.y.z value (comparing against x first, then y, then z).
  For solutions matching "Apply fix<fix> to <product>", create a new combined solution where <fix> for each solution is concatenated into a comma separated list for a given<product>.

In accordance with at least a second and third embodiment, when working with datasets with metadata available that have an identifier that allows grouping of solutions based on product (e.g., common product enumeration (CPE)) and timestamp information on when a fix has become available, the solutions for each group can be filtered with only display the latest "top level" solution for each group being displayed. In an example, the first and second embodiments can be implemented in conjunction with each other to produce a further refined solution set.

As used herein, a "plug-in" contains logic and metadata for an individual security check in a security auditing application. A plugin may check for one or more mitigations/fixes and flag one or more individual security issues. CPE is a standardized protocol of describing and identifying classes of applications, operating systems, and hardware devices present among an enterprise's computing assets. CPE identifiers contain asset type information (OS/Hardware/Application), vendor, product, and can even contain version information. An example CPE string is "cpe:/o:microsoft:windows_vista:6.0:sp1", where "/o" stands for operating system, Microsoft is the vendor, windows_vista is the product, major version is 6.0, and minor version is SP1. Further, a common vulnerabilities and exposures (CVE) identifier is an identifier from a national database maintained by NIST/Mitre which keeps a list of known vulnerabilities and exposures. An example identifier would be "CVE-2014-6271" which corresponds to the "ShellShock" vulnerability in the database.In accordance with one implementation of the second embodiment, solutions (or solution 'texts') may first together based on the CPEs in the plugins they were reported in.

The solutions are then sorted by the patch publication date from the plugins which they were sourced from. Solutions containing text that matches a pattern that indicates that the solution is likely a patch recommendation can all be removed from the group except the solution associated with the most recent patch. In this manner, patches with identifiers that cannot be easily sorted (e.g., patches with non-numerical identifiers) and/or for which no ruleset pertains in accordance with the first embodiment can be filtered out from the solution set. In some implementations or other embodiments, additional ruleset-based filtering from the first embodiment can also be applied, to filter out (or de-duplicate) additional duplicate solution information.

In accordance with a second embodiment, a security auditing application may evaluate further metadata in the solution report results that is added based upon asset-specific information (e.g., such as individual patches installed, which mitigations and patches are missing, what individual software installations are installed, patch supersedence information, the relationship between the mitigations/patches and security issues, etc.).

Figure 3:
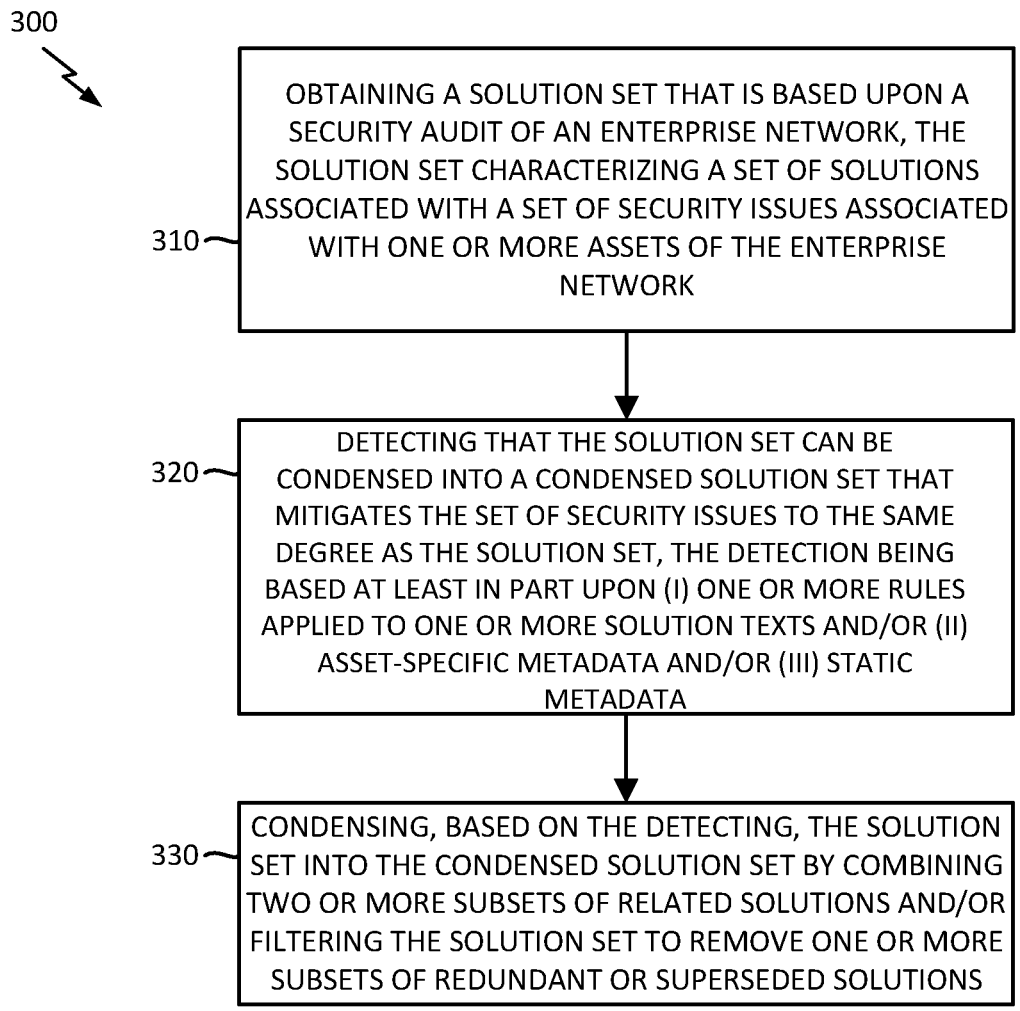
FIG. 3 illustrates an exemplary process for filtering a solution set obtained from a security audit scan of an enterprise network in accordance with an embodiment of the disclosure.

FIG. 3 illustrates an exemplary process 300 for filtering a solution set obtained from a security audit scan of an enterprise network in accordance with an embodiment of the disclosure. In an example, the process 300 of FIG. 3 may be performed by a security auditing component of a vulnerability management system, such as the vulnerability management system 150 of FIG. 1. In particular, the process 300 of FIG. 3 may be implemented via a security auditing application that is executed on the security auditing component. In some designs, the security auditing application is implemented as a library that updates a plugin database as plugins are executed (e.g., during a security audit scan of an enterprise network).

Referring to FIG. 3, at 310, the security auditing component obtains a solution set that is based upon a security audit of an enterprise network, the solution set characterizing a set of solutions associated with a set of security issues associated with one or more assets of the enterprise network. In an example, the security auditing component may receive the solution set from another component of the vulnerability management system, although the security auditing component may alternatively be responsible for generating the solution set.

At 320, the security auditing component detects that the solution set can be condensed into a condensed solution set (e.g., a minimized solution set) that mitigates (e.g., fixes, patches, etc.) the set of security issues to the same degree as the solution set based at least in part upon (i) one or more rules applied to one or more solution texts (e.g., as in the first embodiment noted above) and/or (ii) asset-specific metadata (e.g., as in the second embodiment noted above) and/or (iii) static metadata (e.g., as in the third embodiment noted above). Put another way, the condensed solution set can effectively provide the full effects of the original (or non-condensed) solution set. At 330, the security auditing component condenses, based on the detection of 320, the solution set into the condensed solution set by combining two or more subsets of related solutions and/or filtering the solution set to remove one or more subsets of redundant or superseded solutions.

Figure 4:
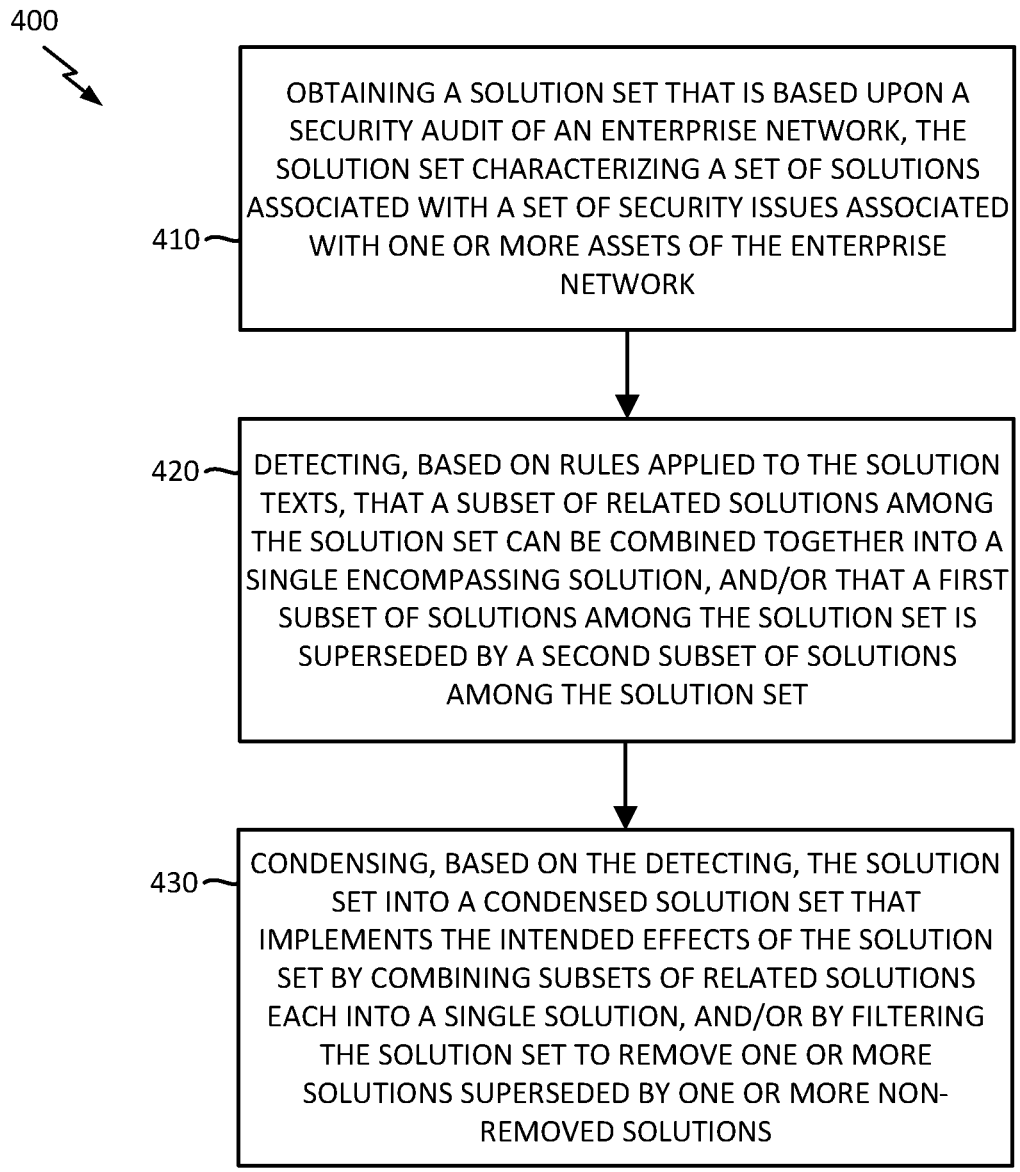
FIG. 4 illustrates a process which is an example implementation of the process of FIG. 3 in accordance with an embodiment of the disclosure.

FIG. 4 illustrates a process 400 which is an example implementation of the process 300 of FIG. 3 in accordance with an embodiment of the disclosure. In particular, the process 400 represents an example implementation of the first embodiment described above.

Referring to FIG. 4, at 410 (e.g., as in 310 of FIG. 3), the security auditing component obtains a solution set that is based upon a security audit of an enterprise network, the solution set characterizing a set of solutions associated with a set of security issues associated with one or more assets of the enterprise network. At 420, the security auditing component detects, based on rules (e.g., rulesets) applied to the solution texts, that a subset of related solutions among the solution set can be combined together into a single encompassing solution, and/or that a first subset of solutions among the solution set is superseded by a second subset of solutions among the solution set. At 430, the security auditing component condenses, based on the detection of 420, the solution set into a condensed solution set that implements the intended effects of the (non-condensed) solution set by combining subsets of related solutions (e.g., related in terms of being associated with remediation of common security issue(s)) each into a single solution, and/or by filtering the (non-condensed) solution set to remove one or more solutions superseded by one or more non-removed solutions. It will be appreciated that 420 represents an example implementation of 320 of FIG. 3, while 430 represents an example implementation of 330 of FIG. 3.

Figure 5:
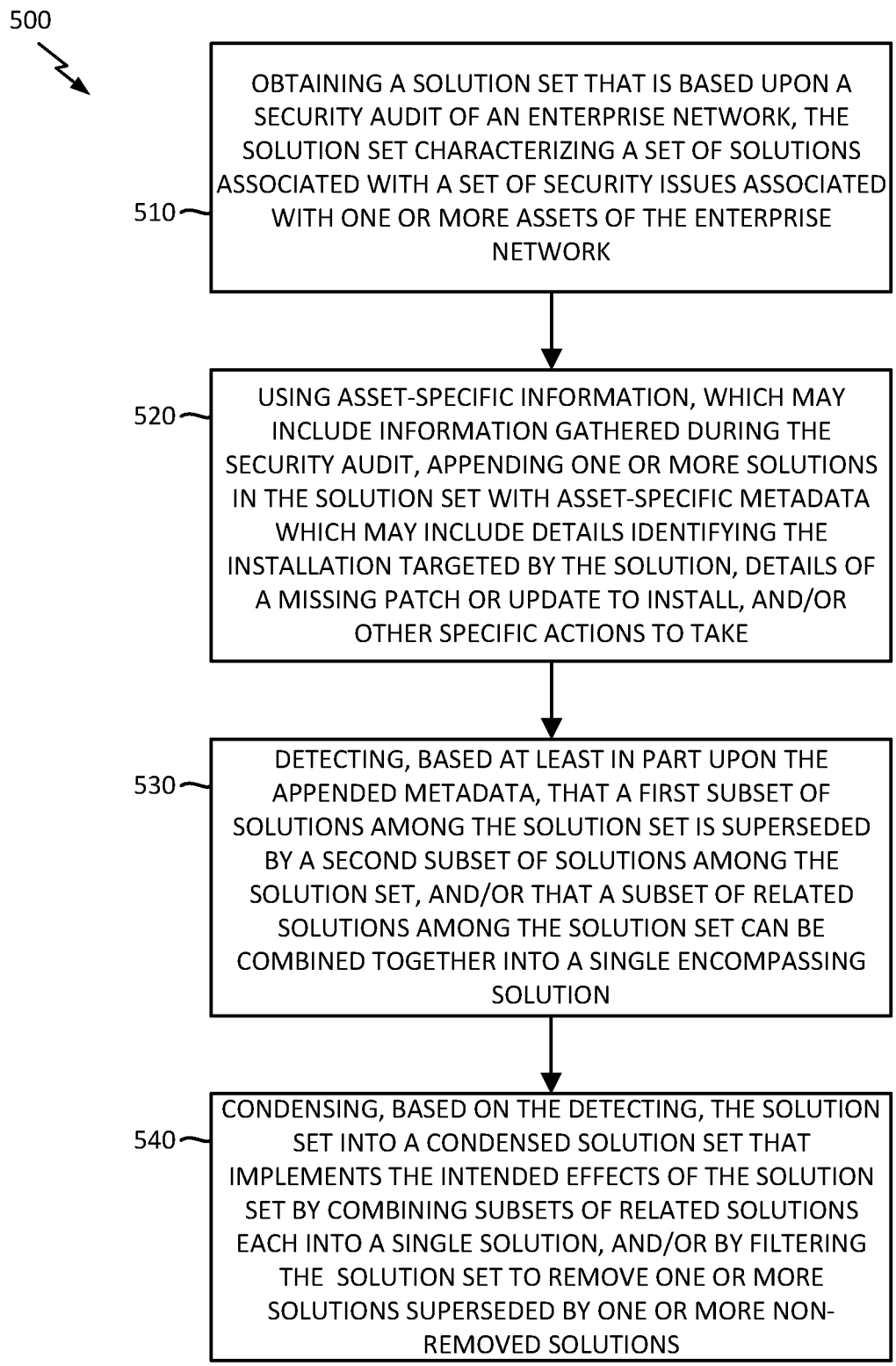
FIG. 5 illustrates a process which is an example implementation of the process of FIG. 3 in accordance with another embodiment of the disclosure.

FIG. 5 illustrates a process 500 which is an example implementation of the process 300 of FIG. 3 in accordance with another embodiment of the disclosure. In particular, the process 500 represents an example implementation of the second embodiment described above.

Referring to FIG. 5, at 510 (e.g., as in 310 of FIG. 3), the security auditing component obtains a solution set that is based upon a security audit of an enterprise network, the solution set characterizing a set of solutions associated with a set of security issues associated with one or more assets of the enterprise network. At 520, the security auditing component appends one or more solutions in the solution set with asset-specific metadata (e.g., include details identifying the installation targeted by the solution, details of a missing patch or update to install, and/or other specific actions to take, etc.). In an example, the appending of 520 is based upon asset-specific information, which may include information gathered during the security audit. At 530, the security auditing component detects, based at least in part upon the appended metadata, that a first subset of solutions among the solution set is superseded by a second subset of solutions among the solution set, and/or that a subset of related solutions among the solution set can be combined together into a single encompassing solution. At 540, the security auditing component condenses, based on the detection of 530, the solution set into a condensed solution set that implements the intended effects of the (non-condensed) solution set by combining subsets of related solutions each into a single solution, and/or by filtering the (non-condensed) solution set to remove one or more solutions superseded by one or more non-removed solutions. It will be appreciated that 530 represents an example implementation of 320 of FIG. 3, while 540 represents an example implementation of 330 of FIG. 3.

While this implementation takes into account the patches required to mitigate vulnerabilities, some vulnerabilities may require manual non-patch resolutions or mitigation. Examples of these interventions may include configuration changes or registry key changes. These fixes may or may not be required in addition to patch fixes. A library generated by the method of FIG. 5 and/or FIG. 3 may be adapted to capture this information as well by adding a function which could be called within vulnerability checks to record the data. This adaptation may require a lot of individual manual plugin changes, but the number of non-patch fixes is far less than patch fixes.

Below is an example of how this data could be stored:

TABLE 1

| Field | Description |
|---|---|
| mitigation_description | Description of the non-patch resolution or mitigation |
| requires_patch | Patch that the mitigation requires (if applicable) |
| cve_list | List of CVEs the mitigation resolves |
| id | unique id index |

Thus, the supersedence logic of FIG. 5 may be expanded beyond plugin supersedence to total mitigation solutions.

Figure 6:
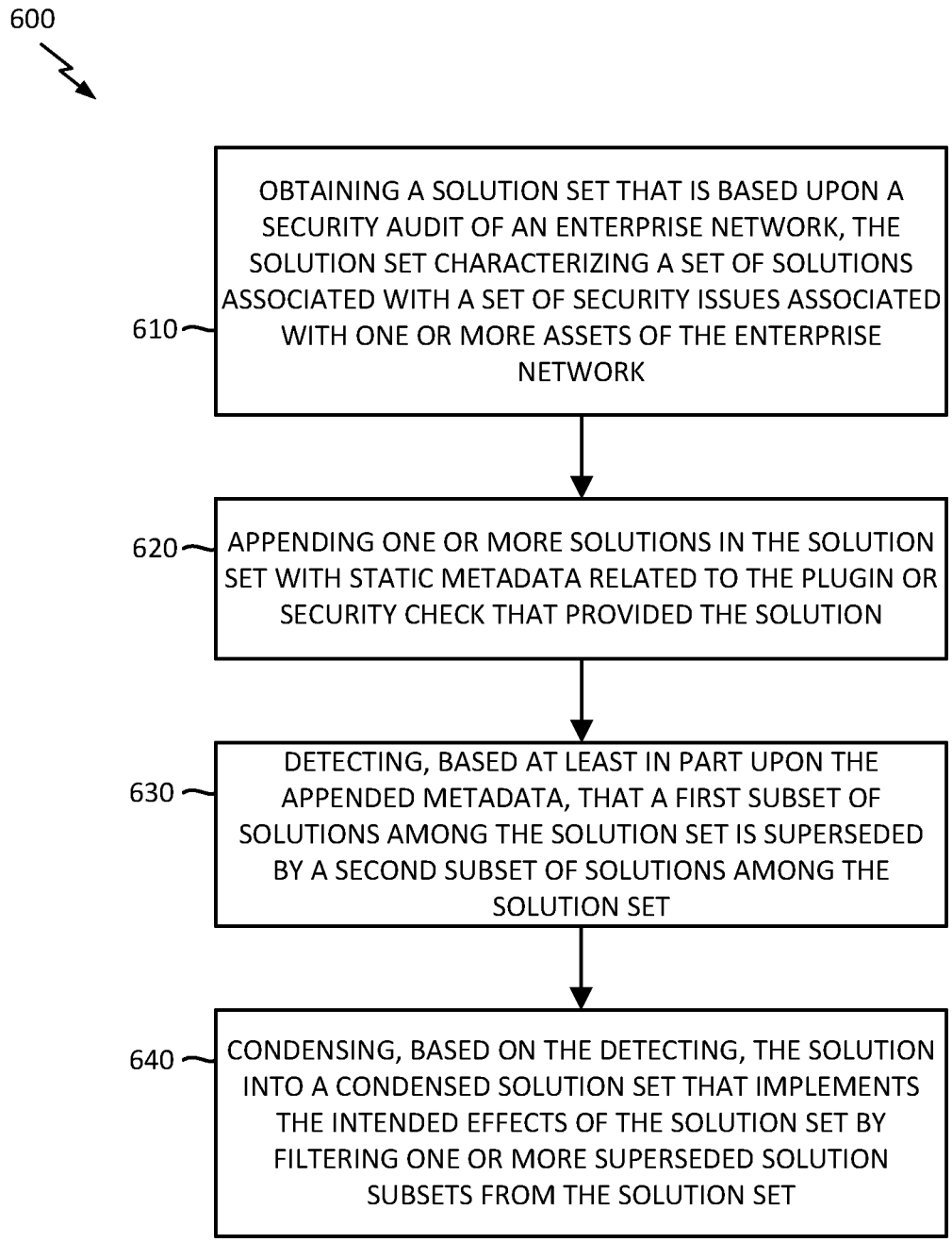
FIG. 6 illustrates an exemplary process for filtering a solution set obtained from a security audit scan of an enterprise network in accordance with another embodiment of the disclosure.

FIG. 6 illustrates an exemplary process 600 for filtering a solution set obtained from a security audit scan of an enterprise network in accordance with another embodiment of the disclosure. In an example, the process 600 of FIG. 6 may be performed by a security auditing component of a vulnerability management system, such as the vulnerability management system 150 of FIG. 1. In particular, the process 600 of FIG. 6 may be implemented via a security auditing application that is executed on the security auditing component. In some designs, the security auditing application is implemented as a library that updates a plugin database as plugins are executed (e.g., during a security audit scan of an enterprise network).

The process 600 of FIG. 6 is not necessarily an example implementation of the process 300 of FIG. 3. However, the process 600 of FIG. 6 may be executed in parallel with the process 300 of FIG. 3 and/or in a hybrid manner whereby aspects of processes 300 and 600 are merged together in certain aspects of the disclosure. Further, the process 600 of FIG. 6 represents an example implementation of the third embodiment noted above.

Referring to FIG. 6, at 610, the security auditing component obtains a solution set that is based upon a security audit of an enterprise network, the solution set characterizing a set of solutions associated with a set of security issues associated with one or more assets of the enterprise network. At 620, the security auditing component appends one or more solutions in the solution set with static metadata related to the plugin or security check that provided the solution. For example, static metadata is neutral in terms of the assets associated with the security scan, and as such may be contrasted with asset-specific metadata described above with respect to FIGS. 3 and 5. At 630, the security auditing component detects, based at least in part upon the appended static metadata of 620 (optionally in conjunction with the asset-specific metadata of 520), that a first subset of solutions among the solution set is superseded by a second subset of solutions among the solution set. At 640, the security auditing component condenses, based on the detection of 630, the solution into a condensed solution set (e.g., a minimized solution set) that implements the intended effects (e.g., similarly fixing or patching the various security issues) of the (non-condensed) solution set by filtering one or more superseded solution subsets from the (non-condensed) solution set.

The static metadata may be predefined asset metadata or configurations. In particular for cloud assets, static metadata may include instance creation date, version, configuration, storage size, physical location, DNS name or mapping, public encryption keys, hardware specifications, operating system, static IP, and/or other virtual machine properties. For network hardware such as switches, the static metadata may be firmware version, chipset, hardware specifications, operating system, and/or other configuration information. In general, static metadata may be the descriptive properties of a virtual or physical machine including various names (e.g. hostname, IP, DNS, instance name, groups), resolvers, static mappings, roles in the network or company, authorizations, initialized attributes, and configuration data or scripts. Likewise, applications may have static metadata describing predefined features of their operation or installation including installing user, version, package manager, certificates, registry entries, physical drive location, size, configuration properties (e.g. compile config), and other predefined operational attributes. For database instances, static metadata may include the data schema, the database catalog, access methods, value ranges, and other configuration information. These features stored as static metadata, when appended to a solution or patch, may assist implementing systems with using the solution or allow further filtering/prioritization of the solution set based on assets or narrow the solutions that are necessary (e.g. removing patches for sandboxed installs) or identify orphaned/uninstalled applications for removal from the solution set.

As noted above, the first, second and third embodiments may optionally be implemented in conjunction with each other. Accordingly, the various solution set condensing operations described with respect to FIGS. 3-6 security auditing component may be based upon some combination of one or more rules (or rulesets) applied to solution texts of the solution set for solution de-duplication (first embodiment, FIG. 4), asset-specific metadata (second embodiment, FIG. 5), and/or static metadata (third embodiment, FIG. 6).

In some designs, by implementing the first, second and third embodiments in conjunction with a third party patch data feed and patching application, it is possible to display to the user the latest patch for a given product even if it is not available in the report results, and even allow patches and fixes to be automatically mitigated. As used herein, a third party patch data feed is an external data source (relative to the security auditing component) providing updated data on available patches or updates, and a patching application is an application that manages patches or updates for a target, including installing missing patches In some designs, a third party patch data feed that provides updated data on available patches or updates including details about each patch or update can enable new solutions to be provided in addition to solutions provided by plugins based on the details of the patches and details of the existing solutions. For example, if a target is missing a patch, and a new patch has been released that supersedes the missing patch, then without a third party patch data feed the new patch would not be included in a solution until a plugin has been written to check for that patch and recommend it as a solution. With a third party patch data feed, information about the new patch can be utilized even before a plugin is written to check for it, and if the absence of the new patch can be inferred based on the solutions provided by existing plugins, then installing the new patch can be added as a solution that supersedes those existing solutions. In some designs, integrating a patching application may allow solutions related to missing patches or updates to be applied automatically. In some designs, determining a reduced or minimum set of solutions using the first, second and third embodiments may allow the patching application to apply patches more efficiently by only installing a reduced or minimum number of patches to resolve the security issues discovered.

In some designs, the process 300 of FIG. 3 may be used to process and/or filter various solution sets, such as "compliance" reports(e.g. PCI ASV reports), which require consolidated solutions for all vulnerabilities found on a given target.

In one example implementation of the process 300 of FIG. 3, each data point for supersedence comparison at 320 is a single missing patch or update on a single installed instance of a product. A plugin result cannot be used as a distinct data point because a plugin can report on more than one product or more than one installation of a product. By way of example:

TABLE 2

| Plugin # | Solution |
|---|---|
| Plugin A | Foo 1.2.3, Bar 1.2.3 |
| Plugin B | Foo 1.2.3, Sam 1.2.3 |

As will be appreciated, Plugin B only supersedes Plugin A if Foo is installed and Bar is not installed.

In some example implementations, vulnerabilities and their identifiers such as CVEs are merely references to missing patches and patch supersedence. In some designs, a vulnerability does not supersede another vulnerability; rather, a patch supersedes another patch. For example, a single missing patch/update may reference several vulnerabilities, and a single vulnerability may reference several patches. Hence, a 1:1 relationship or dependency may not exist, only a reference.

In some example implementations, a plugin is not a data point for supersedence, but it is an important reference point in order to link the missing patch/update to cross-references and description information. A plugin can be considered "fully superseded" only if all of the missing patches/updates referencing that plugin have been superseded by patches/updates referencing other plugins, as shown above with respect to the example in Table 1.

In some example implementations, supersedence can be calculated in different ways for different products, including but not limited to: version comparison (many applications), integer comparison (build numbers), RPM comparison, Cisco version comparison, JunOS version comparison, Microsoft KB custom supersedence mapping. In some example implementations, storing installation information, missing patch/update information, and calculated supersedence data as discrete data outside of the plugin result text will open up the opportunity to sort, filter, and cross-reference this data. With the raw data available, a user interface could show partially superseded vs. fully superseded results differently, showing for a partially superseded plugin which missing patches have been superseded and which have not. Various solution reports could be generated against different filter conditions. An example would be a consolidated solution that reports all critical vulnerabilities in a customer's environment (e.g., enterprise network).

To illustrate the scanning and implementation of the various concepts described above, the following examples provide some use cases. Assume there are two copies of VMware Player on a target, installed in different locations: VMware Player 12.5.8 at C:\Program Files x86\VMware\VMware Player VMware Player 14.1.0 at C:\Program Files\VMware\VMware Player. A scan by plugin 105783 would find the following updates missing: "VMware Player 12.x<12.5.9\14.x<14.1.1 Multiple Vulnerabilities (VMSA-2018-0004) (VMSA-2018-0005) (Spectre)" Path: C:\Program Files\VMware\VMware Player Installed version: 14.1.0 Fixed version: 14.1.1 Path: C:\Program Files x86\VMware\VMware Player Installed version: 12.5.8 Fixed version: 12.5.9. A scan by plugin 110098 may identify the following: "VMware Player 14.x<14.1.2 Multiple DoS (VMSA-2018-0013)" Path: C:\Program Files\VMware\VMware Player Installed version: 14.1.0 Fixed version: 14.1.2 audit-trail:success: The VMware Player version 12.5.0 installed under C:\Program Files x86\VMware\VMware Player is not affected. A scan by plugin 111978 may find that "VMware Player 14.x<14.1.3 Out-of-Bounds Write (VMSA-2018-022)" Path: C\Program Files\VMware\VMware Player Installed version: 14.1.0 Fixed version: 14.1.3 audit-trail:success: The VMware Player version 12.5.0 installed under C:\Program Files x86\VMware\VMware Player is not affected.

A typical plugin-based supersedence may show the following in scan results with superseded plugins hidden. Plugin 110098 may find that "VMware Player 14.x<14.1.2 Multiple DoS (VMSA-2018-0013)" Path: C:\Program Files\VMware\VMware Player Installed version: 14.1.0 Fixed version: 14.1.2 audit-trail:success. Thus, the VMware Player version 12.5.0 installed under C:\Program Files x86\VMware\VMware Player is not affected. Plugin 111978 may find that "VMware Player 14.x<14.1.3 Out-of-Bounds Write (VMSA-2018-022)" Path: C:\Program Files\VMware\VMware Player Installed version: 14.1.0 Fixed version: 14.1.3 audit-trail:success. Thus, the VMware Player version 12.5.0 installed under C:\Program Files x86\VMware\VMware Player is not affected. Thus, under this logic, there may be no result showing that the 12.x installation is missing the update to version 12.5.9 of VMware. In this example, plugin 111978 has the wrong CPE. That is "cpe:/a:vmware:workstation" is analyzed instead of "cpe:/a:vmware:player", so standard scanning logic would not compare the two plugins or their results.

The system actually needs to identify that the VMware Player installation at C:\Program Files x86\VMware\VMware Player is missing top-level patch/update 12.5.9. Likewise, the system in this example should identify that the VMware Player installation at C:\Program Files\VMware\VMware Player is missing top-level patch/update 14.1.3.

A raw patch report output for this example may include the following items. The remote host is missing the following top-level patches or updates: VMware Player; Installation Path: C:\Program Files x86\VMware\VMware Player; Installed Version: 12.5.8. Missing Update: 12.5.9 Reference Plugin: 105783 (vmware_player_win_vmsa_2018_0004.nasl) Superseded References: N/A Covered CVEs: CVE-2017-5715, CVE-2017-4949, CVE-2017-4950. Likewise, for Installation Path: C:\Program Files\VMware\VMware Player and Installed Version: 14.1.0 the plugin will identify: Missing Update: 14.1.3 Reference Plugin: 111978 (vmware_player_win_vmsa_2018_0022.nasl. Thus, the Superseded References: 105783, 110098 and Covered CVEs would be: CVE-2017-5715, CVE-2017-4949, CVE-2017-4950, CVE-2018-6963, CVE-2018-6973.

Based on this information in the raw report, the system may highlight plugins 105783 and 111978 as containing a top-level missing patch, and plugin 110098 may be dimmed as being fully superseded. Thus, when viewing the details of any of the plugins, the user interface of the system may show any related missing patches/updates and whether each has been superseded. For superseded patches, the system may link to the plugin related to the superseding patch. The user interface of the system may display an application-based view as an alternative to a plugin-based view, using the plugins as references. The user interface of the system may display a vulnerability-based view, using both the missing patches and the plugins that discovered them as references.

Ultimately, the installation data, data on missing patch/update, and data on fully superseded plugins may be stored in the scan results database at the end of a scan. Ideally, the data may be stored there throughout the scan as well, but current functionality may impose some limitations. First, only trusted/signed/authorized plugins may be able to access the scan results database directly during the scan; and most vulnerability plugins may rely on information that has already been gathered, and thus, may not be trusted signed/authorized.

To securely use plugins, the system may be configured or designed in a few different ways. The system may sign and authorize all plugins. Based on a standard search of plugin repos or plugin folders, a system may have 883 signed non-pre-compiled plugins and 99,308 unsigned non-pre-compiled plugins. That is, about 99% of plugins are unsigned. Updating roughly 99% of our non-pre-compiled plugins may be disruptive to a plugin feed pipeline and to downstream scanning installations that would need to be defragmented. In addition, verifying the signatures of 112 times the normal number of signed plugins would likely have a significant impact on system efficiency.

Alternatively, the system in another implementation may request that new script/plugin functions (e.g. NASL engines) allow unsigned plugins to add new data to the scan report. This would add a dependency on the plugin engine and may significantly delay implementation of the system. Likewise, this may force the new logic to only be applied to future versions of the vulnerability scanner rather than allowing all currently supported versions to benefit. Implementing a majority of the functionality in the scanning engine may forfeit the agility of the scanner's feed through the migration and transition to the new logic.

Alternatively, the system in another implementation may execute the plugins and store the data in a scratchpad or sandbox until the end of the scan, then copy the scan data to the scan results database using a trusted, signed plugin. This option may potentially replicate a bottleneck that existing plugin 66334 "Patch Report" causes at the end of a scan. If scanning engine functions are later added to allow for storing the data in the scan results database throughout the scan, a refactor to the library may be needed to call the new functions depending on the scanner version. This third option may be chosen as the path of least resistance with the least unknowns, least dependencies, most backwards compatibility, and most acceptable drawbacks.

The system in an exemplary implementation may have a scanning system that may use logic handler objects in separate include files to manage the actual supersedence calculations for two primary reasons. First, each logic method may use a different function to perform supersedence calculations, such as ver_compare( ) in misc_func.inc and rpm_cmp( ) in rpm.inc. If each vulnerability plugin needed to include functions for all of the comparison functions, the compiled size of the plugins may be bloated. By separating each logic method into its own include file, only the necessary files for that logic method to be applied may be included. The functions needed for the logic method are likely already included in the compiled plugin. This is due to the fact that the logic method for supersedence comparison may often be the same logic method used by the plugin to determine whether or not the remote version is vulnerable. Second, by using objects, the same function name may be used for the primary logic handling function of each logic method, simplifying the high-level functions that call the logic handlers. Thus, the compare_findings( )function of each object, for example, may be standardized to take the same parameters and return results in the same format. This object level standardization similar to the use of shell handler objects in the sshlib library, which are all expected to have certain functions such as run_command( ). In order to confirm the validity of the compare_findings( )function, each function may be written to respond to obj.compare_findings("TEST") with TRUE. This allows high-level functions to validate that the object definition was written correctly before attempting to use it, which can limit dump errors in case of a mistake. The name of the object to be created may be stored in an array of logic methods linked to their logic objects, so that all a high-level function like add_finding( ) may need to do is create the designated logic object and call the compare_findings( )function with the references to compare.

The system may generate a product findings table. In the Product_Findings table, each finding has a field called "superseded_by" which may be NULL or may contain an integer referencing another finding in the same table. This field may reference the top-level finding that supersedes the finding. Alternatively, this field may reference whichever finding was found to supersede the finding (not necessarily the top-level finding) to aid troubleshooting. However, keeping that field updated with the top-level finding whenever the top-level finding in a tree is superseded allows for the table to be queried by the top-level ID. For example, for finding id 20 with a superseded_by of 1005, the system may query id 1005 to identify the top-level finding. From there, the system may also query all records with a superseded_by of 1005 to see all patches that finding 1005 supersedes. This arrangement of the table and field is more useful than knowing exactly which other finding each finding was compared against, and it eliminates the need to keep a separate mapping of top-levels to which findings they supersede.

The system may have various conventions for library functions of the libraries provided with the system. Most functions in the library should return a list in the following format: return number and return type. Data returned by a function may be of any type and is a standard return. A boolean return indicates failure or success of the execution of the function. An error may return as a string by a function. For example, a successful response may be return [TRUE, app_id]. An unsuccessful or failed response may be return [FALSE, FALSE, 'Argument'+argname+'is empty or NULL.']. If the function succeeded in retrieving the data but a non-fatal error was encountered, the error message may be returned with a successful response, though the calling function may not look for it. For example, the function may return: return [TRUE, info, "Multiple records found"]. This standardization allows for one-line verification and pass-through from function to function, such as if (ret[0]) return ret; if (!ret[0]) return ret; or if (!ret[0]) return ret_err(ret[2]). The exception may be particular cases where the usage of a function indicates that it should only return TRUE or FALSE. For example, patch::check tables( ) just checks to see if the scratchpad tables exist or not, the function never returns data, and the function does not need to provide additional error message information. This allows it to be used with the construction 'if (!check_tables( ))' rather than storing the result and checking it. Other boolean only functions may also be exceptions.

The system may also capture error and debugging information from the various plugins that are executed into a single log file. In one implementation, a function "patch::dbg(src, msg, ddata)" operates as a wrapper for dbg::log( ) in debug.inc and may be used for general non-error debugging messages. Debugging output may be directed to a patch_supersedence.log file to keep logs in one place, rather than scattered throughout individual logs for each vulnerability plugin. The source (e.g. src) may either the object name+function name reporting the message or just the function name if the source is outside the object. The source may be prepended with the current plugin filename and the patch:: namespace before being passed to dbg::log( ) The message (e.g. msg) is the debugging text to report; and the returned data (e.g. ddata) is any data that should be dumped as hex/ascii as part of the debugging log.

Likewise, the system may consolidate error reporting. In one implementation, a function "patch::set_err(src)" operates as a wrapper for patch::dbg( ) for reporting errors. The wrapper accepts the error message as an anonymous argument (arg) and prepends '[ERROR]' to the message. The argument "src" may just be passed through to patch::dbg( ). This wrapper also may append the error to variable patch::errs, creating a cumulative list of errors (during runtime of each plugin only). The system may hook into this wrapper to capture and report errors even when debugging is not enabled.

The system may also provide a wrapper of the form "patch::ret_err(src, ret)" that operates as a wrapper for patch::set_err( ) that also returns to the calling function. By default, the wrapper may return [FALSE, FALSE, <error message>], consistent with the expected return format of most functions in the library. The 'ret' parameter allows an argument to be passed to override the default return value. For example, if the calling function returns TRUE/FALSE, the argument to 'src' may be passed through to patch::dbg ( ).

The system may use patch::dbg( )rather than the corresponding wrapper when the message is informational and/or not an error. The system may use patch::set_err( )rather than the corresponding wrapper when the error is being set, but the calling function isn't immediately returning. The system may use return patch::ret_err( )rather than the corresponding wrapper when the calling function is returning immediately due to the error. Alternatively, the system may use the function's raw return when the function that discovered the error is a utility function like patch::validate_str_arg( ) but the error message would be more useful coming from the utility function's calling function. In this case, the system may pass back the error with "return [FALSE, FALSE, <error message>]" and then the calling function can set and return the error with "if (!ret[0]) return ret_err(ret[2])".

For protection of the integrity of the data, especially for data that may be directed to the scan results database, the adding and updating of data in the tables is managed by objects. Specifically, each dynamic table has its own handler object. Static tables are initialized upon creation and not further modified. Each table handler may have public convenience functions to get data, public functions to validate data add/update requests, and private functions to actually add/update the data. This ensures, for example, that any new application that may be added gets synced through the global KB first, and that duplicate installations are not added.

At runtime, which in some implementations may be in a scratchpad, the supersedence logic may generate a table with the following variables/columns:

| Field | Type | Description |
| --- | --- | --- |
| logic_id | int | Primary key, unique ID |
| name | text | Descriptive name |
| obj | text | Name of the logic object used to determine supersedence for the logic method |

An example table output is:

| logic_id | name | obj |
| --- | --- | --- |
| 1 | "Version comparison" | "patch::logic_ver_comp" |
| 2 | "Integer comparison" | "patch::logic_int_comp" |
| 3 | "RPM comparison" | "patch::logic_rpm_cmp" |
| 4 | "Microsoft custom mapping" | "patch::logic_map_ms" |

At runtime, the product family logic may generate a table with the following variables/columns:

| Field | Type | Description |
| --- | --- | --- |
| prod_family_id | int | Primary key, unique ID |
| name | text | Descriptive name |
| default_logic_id | int | ID of default logic method, references SupersedeLogic(logic_id) |

An example table output is:

| prod_family_id | name | default_logic_id |
| --- | --- | --- |
| 1 | "Mozilla Firefox" | 1 |
| 2 | "Google Chrome" | 1 |
| 3 | "Adobe Reader" | 1 |
| 4 | "Microsoft Office" | 4 |

At runtime, the product identifier logic may generate a table with the following variables/columns:

| Field | Type | Description |
| --- | --- | --- |
| prod_uuid | text | Primary key, UUID |
| name | text | Descriptive name |
| prod_family_id | int | ID of product family, references ProductFamilies (family_id) |
| logic_id | int | ID of logic method, references SupersedenceLogic (logic_id) |

An example table of product IDs is as follows:

| prod_uuid | name | prod_family_id | logic_id |
|---|---|---|---|
| fc2834a3-f... | "Mozilla Firefox" | 1 | 1 |
| fc479704-f4... | "Mozilla Firefox ESR" | 1 | 1 |
| fcc6f919-9... | "Adobe reader 17.x" | 3 | 1 |

At runtime, the product installs logic may generate a table with the following variables/columns:

| Field | Type | Description |
|---|---|---|
| install_id | int | Primary key autoincrement, unique ID |
| prod_uuid | text | UUID of product, references products (prod_uuid) |
| location | text | Path or package manager where product is located |
| version | text | Installed version of product |

An example table of product installs is as follows:

| install_id | prod_uuid | location | version |
|---|---|---|---|
| 1 | fc2834a3-5... | "C:\Program Files\Mozilla Firefox" | "61.0" |
| 2 | fc2834a3-5... | "C:\Program Files x86\Mozilla Firefox" | "60.0" |
| 3 | fd145d38-3... | "C:\Program Files\Adobe\Adobe Reader" | "15.1.2" |

Another example table of product IDs is as follows:

| install_id | prod_uuid | location | version |
|---|---|---|---|
| 1 | f97b9dc5-1... | "rpm" | "kernel-2.6.32-71.el6|(none)" |
| 2 | 9aafa4e-f... | "rpm" | "samba-client-3.5.4-68.el6|0" |
| 3 | f9adae39-d | "rpm" | "nss-3.12.7-2.el6|(none)" |

At runtime, the product findings logic may generate a table with the following variables/columns:

| Field | Type | Description |
|---|---|---|
| finding_id | int | Primary key autoincrement, unique ID |
| install_id | int | ID of product installation, references ProductInstalls(install_id) |
| missing | text | The patch or update that the install is missing |
| missing_display | text | An optional friendly display name for the missing patch or update |
| script_fname | text | The filename of the plugin that discovered that the patch or update was missing |
| superseded_by | int | ID of top-level finding that supersedes this finding (if applicable), references ProductFindings(id) (same table) |
| potential_fp | int | Set to 1 for TRUE if the reporting plugin did not produce output; a mitigation may be in place or reporting may require higher paranoia based on other factors |

An example table without the missing_display field is as follows:

| finding_id | install_id | missing | script_fname | superseded_by | potential_fp |
|---|---|---|---|---|---|
| 1 | 1 | "62.0" | mozilla_firefox__62__0__0.nasl | 4 | |
| 2 | 1 | "62.0.2" | mozilla_firefox__62__0__2.nasl | 4 | |
| 3 | 1 | "62.0.3" | mozilla_firefox__62__0__3.nasl | 4 | |
| 4 | 1 | "63.0" | mozilla_firefox__63__0.nasl | | |

As can be seen the data or fields in various tables may reference data or fields in other columns or other tables. In particular, the product family logic output table may reference the logic_id field of the supersedence logic table; the product ID logic output table may reference the logic_id field of the supersedence logic table and the product_family_id of the product family table; the product install logic output table may reference the prod_uuid of the product ID table; the product findings output table may reference the install_id of the product installs output table and may reference the product findings ID of the same table.

After the scanning logic has executed and the scripts, engines, and/or applications operating in the scratchpad have completed, the collected data may be dumped or transferred to the scan results database. The final transfer may be by a signed plugin. The data transferred to the results database may also be in table form. The transferred data table for the supersedence logic may be arranged the same as that generated at runtime and provided above. Likewise, the transferred data table for the product families logic may be arranged the same as that generated at runtime and provided above. Likewise, the transferred data table for the product ID logic may be arranged the same as that generated at runtime and provided above.

The transferred data table for the product installs logic may be arranged the same as that generated at runtime and provided above. Alternatively, the transferred data table for the product install logic may have the following elements:

| Field | Type | Description |
|---|---|---|
| install_id | text | Primary key combining host_id and scratchpad install_id (e.g. "4-1", "4-2") |
| host_id | int | ID of host, references Host(id) |
| prod_id | int | ID of product, references Products(prod_id) |
| location | text | Path or package manager where product is located |
| version | text | Installed version of product |

An example table of the product install data maybe as follows:

| install_id | host_id | prod_id | location | version |
|---|---|---|---|---|
| 1-1 | 1 | 1 | "C:\Program Files\Mozilla Firefox" | "61.0" |
| 1-2 | 1 | 1 | "C:\Program Files x86\Mozilla Firefox" | "60.0" |
| 2-1 | 2 | 11 | "rpm" | "kernel-2.6.3271.el6\|(none)" |
| 2-2 | 2 | 12 | "rpm" | "samba-client-3.5.4-68.el6\|0" |

The transferred data table for the product findings logic may be arranged the same as that generated at runtime and provided above. Alternatively, the transferred data table for the product findings logic may have the following elements:

| Field | Type | Description |
|---|---|---|
| finding_id | int | Primary key combining host_id and scratchpad finding_id (e.g. "4-1", "4-2") |
| host_id | int | ID of host, references Host(id) |
| install_id | int | ID of installation, unique per host |
| missing | text | The patch or update that the install is missing |
| missing_display | text | An optional friendly display name for the missing patch or update |
| script_fname | text | The filename of the plugin that discovered that the patch or update was missing |
| plugin_id | int | The ID of the plugin referenced by script_fname (optional) |
| superseded_by | int | ID of top-level finding that supersedes this finding (if applicable), references ProductFindings(id) (same table) (must reference with host_id for relevance) |
| potential_fp | int | Set to 1 for TRUE if the reporting plugin did not produce output; a mitigation may be in place or reporting may require higher paranoia based on other factors |

An example table is as follows:

| Finding_id | host_id | install_id | missing | script_frame | superseded_by | potential_fp |
|---|---|---|---|---|---|---|
| 1 | 1 | 1 | "62.0" | "mozilla_firefox_62_0_0.nasl" | 4 | |
| 2 | 1 | 1 | "62.0.2" | "mozilla_firefox_62_0_2.nasl" | 4 | |
| 3 | 2 | 1 | "kernel-2.6.32-71.7.1.el6" | "redhat-RHSA-2010-0842.nasl " | 1017 | |
| 4 | 2 | 2 | "samba-client-3.5.4-68.el6_0.1" | "redhat-RHSA-2010-0860.nasl" | 997 | |

The transferred data after runtime to the results database may include a superseded plugins logic output table. Furthermore, as can be seen with the product installs and product findings tables/data, a host ID is added to data fields or columns to identify separate instances in cloud setups or distributed networks like network 100. The superseded plugins logic output table may have the following elements:

| Field | Type | Description |
|---|---|---|
| host_id | int | ID of host, references Host(id) |
| script_fname | text | The filename of a plugin that has had all of its findings superseded by findings related to other plugins. |
| plugin_id | int | The ID of the plugin referenced by script_fname |

Only one of script_fname and plugin_id may be provided. When a value for this field is not provided, the system may default to plugin_id for the plugin reference. When both fields are provided, the fields may refer to the same plugin so either field may be preferred. An example table may be as follows:

| host_id | script_fname | plugin_id |
|---|---|---|
| 1 | "mozilla_firefox_62_0_0.nasl" | 117294 |
| 1 | "mozilla_firefox_62_0_2.nasl" | 117668 |
| 2 | "redhat-RHSA-2010-0842.nasl" | 50629 |

Any or all the data tables above may be a part of the data generated during runtime and may be a part of the data transferred to the results database. Some of the data fields in these tables overlap or may be linked to the same data fields. The data fields or each data field may be generated by one or more plugins of the scanning system. The order of generation/output of the tables may be in the order listed or some other order.

Figure 7:
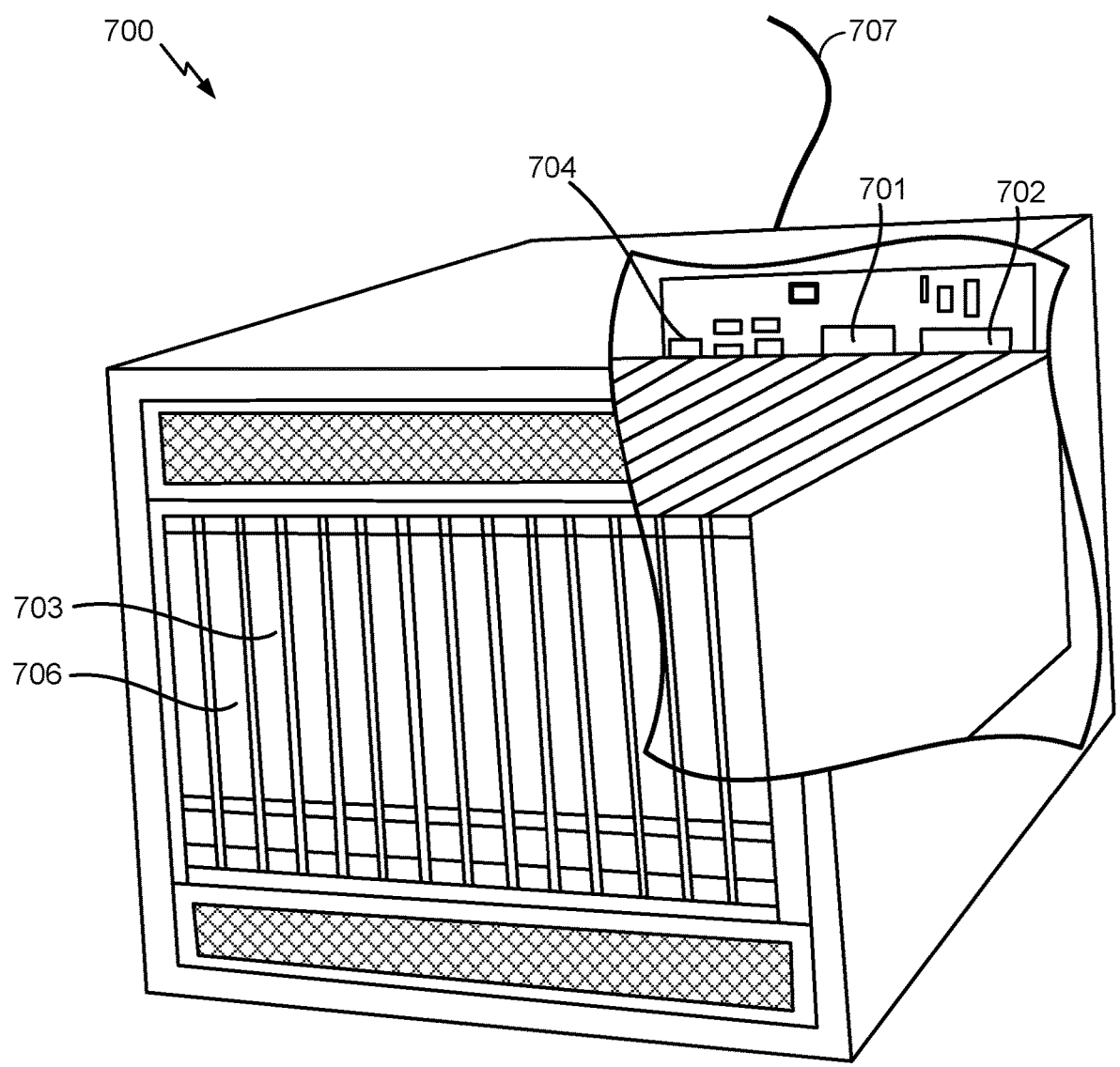
FIG. 7 illustrates a server in accordance with an embodiment of the disclosure.

The various embodiments and scanning functions may be implemented on any of a variety of commercially available server devices, such as server 700 illustrated in FIG. 7. In an example, the server 700 may correspond to one example configuration of a server on which a security auditing application may execute, which in certain implementations may be included as part of the vulnerability management system 150 of FIG. 1 or the vulnerability management system 250 of FIG. 2. In FIG. 7, the server 700 includes a processor 701 coupled to volatile memory 702 and a large capacity nonvolatile memory, such as a disk drive 703. The server 700 may also include a floppy disc drive, compact disc (CD) or DVD disc drive 706 coupled to the processor 701. The server 700 may also include network access ports 704 coupled to the processor 701 for establishing data connections with a network 707, such as a local area network coupled to other broadcast system computers and servers or to the Internet.

Figure 8:
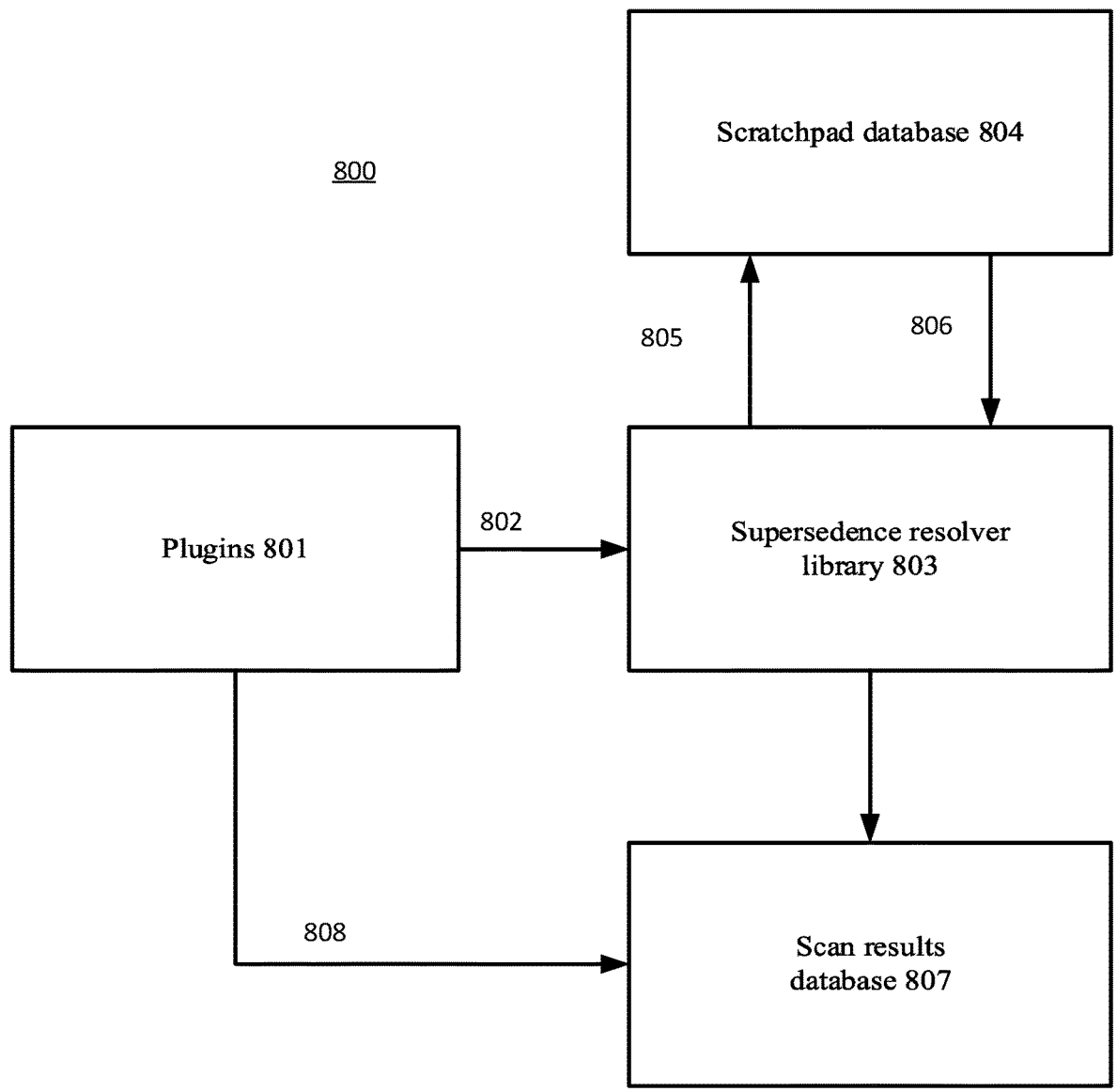
FIG. 8 illustrates a dataflow between plugins in accordance with an embodiment of the disclosure.

The flow of the data generated by the plugins that may be executed on server 700 is illustrated in FIG. 8. As described above, the flow of data 800 out of the plugins 801 is preferably transferred to a scratchpad database 804 before being transferred to the scan results database 807 at the end of the scan for security reasons. The vulnerability management system 150 of FIG. 1 or an active scanner 110 may execute plugins 801 as part of a scanning system or operation. As those plugins 801 scan their respective applications and generate the runtime tables listed above, they may output findings 802 to a dynamic patch supersedence resolver library 803. The resolver library 803 may contextualize the findings relative to other plugin results and then may output each plugin's results 805 to the scratchpad database 804. For unsigned or unauthenticated plugins, the output data tables flow to the scratchpad database 804 for security reasons. In some implementations, a scratchpad database 804 may not be necessary.

After the runtime is ended or after all plugins (or a subset of plugins) have completed scanning, the scratchpad database 804 may output consolidated data tables 806 of all the executed plugins back to the dynamic patch supersedence resolver library 803. The resolver library 803 may then add data relating to superseded plugins to the consolidated data. The supersedence resolver library 803 outputs the consolidated data to the scan results database 807. If some plugins are signed or authenticated by the system, they may output directly to the scan results database 807 or output directly via pathway 808 to the scan results database via the resolver library 803. According to an exemplary implementation, the data tables transferred to the scan results database may be those provided above.

The system 800 for updating or managing supersedence maybe implemented with various exemplary design constructs. In particular, the supersedence resolver library 803 may be used to manage supersedence of the plugins by acting as a central hub or clearinghouse for data as illustrated in FIG. 8. Any of the implementations described with reference to FIG. 8 may perform any of the processes for managing supersedence as described in FIG. 3-6. The supersedence resolver library 803 may update the plugin database as plugins are executed and may update the attributes of plugins for supersedence. Most version checks use a central include file (e.g., install_func.inc or vcf.inc). As a result, a function call like "supersedence::update (handler:"adobe_air", data: {" version":ver})" within the include may update the supersedence attributes as the scan runs and maintain the supersedence chain. In an example implementation, the plugin database is a PluginDB configured as a sqlite database and accessible via a scanner engine (e.g. NASL). Maintaining supersedence data in this manner is easier to implement. After compiling the library and implementing some support for supersedence with individual products, the maintenance and troubleshooting would be minimal. Adding supersedence to a new product would be handled within the library and would not require automation updates or updates to plugins. Since supersedence would be calculated during the scan, the supersedence information generated may only be able to be viewed after the scan is complete and all the library entries/trees are updated.

In an implementation for a Microsoft system, the knowledge base (KB) entries may be handled in this manner. Specifically, missing KBs is stored in a table SMB_HF by the server message block (SMB) hotfixes library along with the related bulletin and plugin script_name. This table and the supersedence mapping in nbin/msft_bulletin_summary/ deprecated_msft_bulletins.inc may be combined to determine supersedence. For superseded KBs, the script_name is stored in an array of candidates_for_deletion. Once all KBs have been evaluated for supersedence, the candidates for deletion are checked, and each script_name is only marked for deletion from the scan results if ALL missing KBs/ bulletins for that plugin have been superseded. This prevents erroneous deletion of only partially overlapping solutions sets. Finally, if showing superseded vulnerabilities is disabled (i.e. not needed for user review), the validated script names in candidates_for_deletion are deleted from the scan results database 807.

In other implementations, whole plugins for products, product families, instances and/or package managers may be managed as libraries or entries in a library. Scan results may be stored and queried by plugin ID, CPE, and patch_publication_date. Various plugins within a library are compared for supersedence if CPE values match. Note that each plugin ID has only one CPE value, which is a list of all of the "cpe" attributes in that plugin. The list must match exactly for two plugins to be compared for supersedence. This helps avoid considering a plugin with multiple CPEs as superseded by a plugin with a subset of those CPEs. This may minimize the usefulness of the consolidation. Supersedence may then be determined based on patch_publication_date, where newer dates supersede. Superseded plugin IDs are added to a list of plugins to delete. Finally, if showing superseded vulnerabilities is disabled, the plugin IDs in the delete list (e.g. IDs_to_delete) are deleted from the scan results either within library 803 or database 807.

This approach addresses the problem of the dynamic nature of plugin supersedence due to plugins containing multiple missing patches. For example, if plugin A checks three different packages, and plugin B checks five different packages, one of which is also covered by plugin A, then plugin B will supersede plugin A only when that common package is vulnerable—and that could vary between hosts in a scan. Updating the global plugins database with plugin attributes may not handle this sort of situation. For another host with different packages and versions, plugin B may not supersede plugin A, and applying supersedence would incorrectly hide the result of plugin A.

Related to the above, in another implementation, the scan result database tables 807 may be used to manage the supersedence, (i.e. query_report( )instead of query_scratchpad( )). The plugins/libraries can populate the data into a table, and the product can use that table to actually process the supersedence criteria. The supersedence criteria may be updated live during a scan, for instance Nessus/T.io already read the report or scan result database 807 live to show scan progress. As an added bonus, putting the tables in the report will leave them in the scan result database 807 for troubleshooting.

Figure 9:
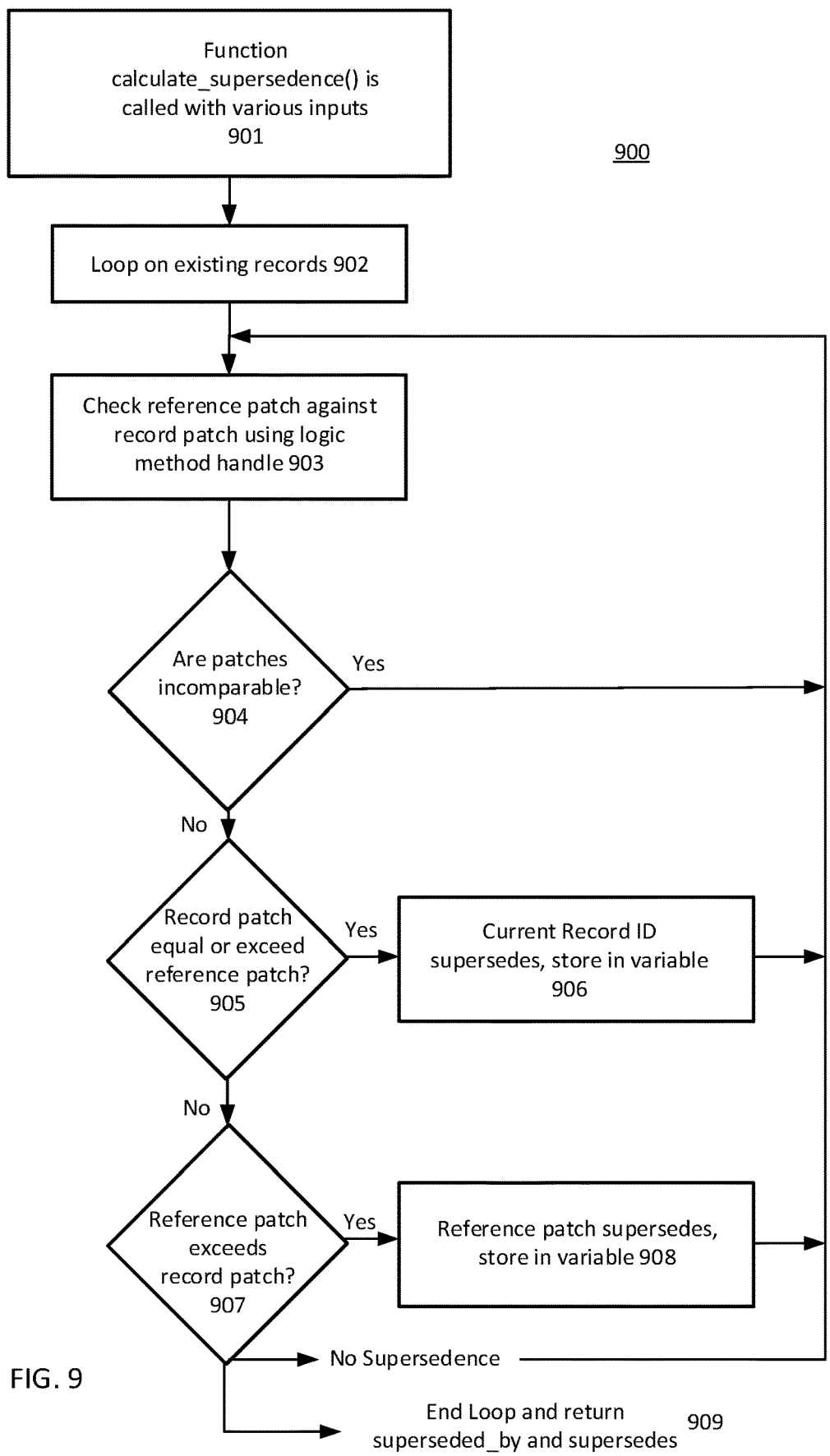
FIG. 9 illustrates a process which is an example implementation of the process of FIG. 3 in accordance with another embodiment of the disclosure.

In an exemplary implementation, the scan result database 807 may include three tables for managing supersedence. A first table may function as a master missing_patches table (similar to the SMB_HF table) that holds vulnerability "items". These items may include: id (a unique index), host_id (linked to host_id used elsewhere in the scan result database), product_name, reference, script_name (of reporting plugin), and superseded_by. The product name item may be as simplified as possible, but as specific as necessary (e.g. OS type, OS, OS version, product branch, etc) to make all items with this product_name comparable, like a simplified CPE. Examples may be RHEL5: glibc, Linux:OracleJDK6, Wireshark2.2. The reference item is an attribute used for comparison and may include the patch ID that is missing, the updated package version that is missing, the expected build ID that is missing, or the patch date as a last resort. The item superseded_by may remain empty until updated by processing. The item may be filled with the id of the reference that the plugin was compared against and determined to supersede this one, i.e. the id that ended up staying in or going into superseding_id when this entry was processed. FIG. 9 illustrates this process in more detail as an example implementation of the process of FIG. 3 in accordance with another embodiment of the disclosure.

A second table may be a patch_supersedence table that tracks patch supersedence. This second table may have the following items: host_id (same as in first table), product_name (same as in first table), superseding_id (id (index) of the highest superseding entry in the missing_patches table), and supersedes (list of ids from the missing_patches table that are superseded by superseding_id). A third table may be a superseded_plugins table that tracks plugins that have been superseded. This table may include the following: host_id (same as other tables), and script_name (Filename of plugin that has had all of its missing patches superseded by other plugins).

In this implementation, plugins (via vulnerability check libraries) add an entry to the missing_patches table for each missing patch or update via existing functions that evaluate or report vulnerabilities, (e.g. smb_hf_add( ), rpm_report_add( ), google_chrome_check_version( )). The product_names would be set in these reporting functions to ensure standardization and to avoid typographical errors.

In this implementation, a minimal new scanner library (e.g. NASL library) would provide a function for updating missing patches and mapping of various variables. The function may be one that accepts missing patch info and updates the missing_patches table, (e.g. add_missing_patch (product_name:app_name, reference:fix)). The mapping may include linking product_name to compare_logic which specifies how the references for that product should be compared. For instance, KBs are compared with KBs. Likewise, comparisons can be made with product versions, builds, or RPM package version. The scanner library may be an include file so that new product names do require a product update, only new comparison types would require an update. Static references like the Microsoft Knowledge Base (MS KB) mapping may be maintained in the scanner library for ease of updating and ingested by a product when updating plugins.

The product may receive data in the missing_patches table to process supersedence and store results in patch_supersedence table. The product may Process each item in the missing_patches table. If product_name does not exist in the second table, the product or an update function may add this item and move on to the next item. In other cases, the product may compare references using designated compare_logic. Comparisons may be implemented natively or reference scanner functions. For each superseded item, the product may update field superseded_by in missing_patches table to identify the superseding item (with id field). Or the product may update the supersedes field in patch_supersedence table to append this product id. For a non-superseded item, if the item is different from current superseding_id in patch_supersedence table, then update the superseding_id. After all items are processed and scan has completed, the system may query the missing_patches table for a list of unique script_names that have superseded_true (have the superseded_by field populated) or superseded_false (do not have the superseded_by field populated). TH eproduct may then iterate over superseded_true and if script_name is not in superseded_false, then all references for that script_name have been superseded, add script_name to the third table: superseded_plugins.

Supersedence processing at the product level may be performed live as the scan is running and data is being added to the table or performed after the scan has completed. A function may reprocess supersedence data based on the original missing_patches table if a plugins update modifies mappings or comparison functions. This implementation may create a table of vulnerabilities data separate from text-based plugin output. This data may be displayed in a user interface in a number of ways. The script_name is used because the field is a global variable that all plugins can easily access, but it can be used to pivot to script_id, and from there to lists of CVEs and other references. A field like "installed" may be added to show the build or version level found for some products or be empty or a field of "not found" may be added for something like a missing patch ID. This feature may not be needed for supersedence calculations but would make the table more generally useful for user interface display features and for troubleshooting.

The process 900 for determining supersedence of patches based on records from the product findings is illustrated in FIG. 9. The process 900 begins by calling a function to calculate the supersedence at 901 (e.g. calculate supersedence) and provides that function with a missing patch or update string as a reference, a list of existing findings table records to compare against, or a logic handler method object. These inputs are used to loop over existing record at 902. For each patch, a reference patch is checked against a record patch using a logic method handle at 903. The patches are then checked for compatibility at 904, and if they are incomparable ("yes" at 904), then the function fails out and proceeds to operate on another patch input, and if they are not incomparable ("no" at 904), the function proceeds to compare. In particular, at 905, the function determines if the record patch is equal to or exceeds the reference patch. If so ("yes" at 905), then the function proceeds to 906 and stores as a variable the current record ID as superseding. This meet or exceed comparison may be based on release date, versioning of the patch, or supersedence metadata.

If the record patch does not meet or exceed the reference patch ("no" at 905), then the function proceeds to determine if the reference patch exceeds the record patch at 907. If the reference patch does exceed the record patch, the function determines that the reference patch supersedes the record patch, then the reference patch supersedes and is stored as a variable at 908. The final case of no supersedence, where patches are comparable but are not equal nor exceed each other, is rare but may occur if for instance an application is re-programmed from the ground up (e.g. Microsoft Edge) but has a common code base and product family. The initial determination of comparability of patches at 904 may be based on the product family, product update manager, or product install information. After some or all inputted arguments or patch records have been compared and the calculation of each patch's supersedence is complete, the function or process 900 may return at 909 the variables "superseded_by" and "supersedes" for one or more plugins. These variables may then be sent to the scan results database 807 or the resolver library 803.

Figure 10:
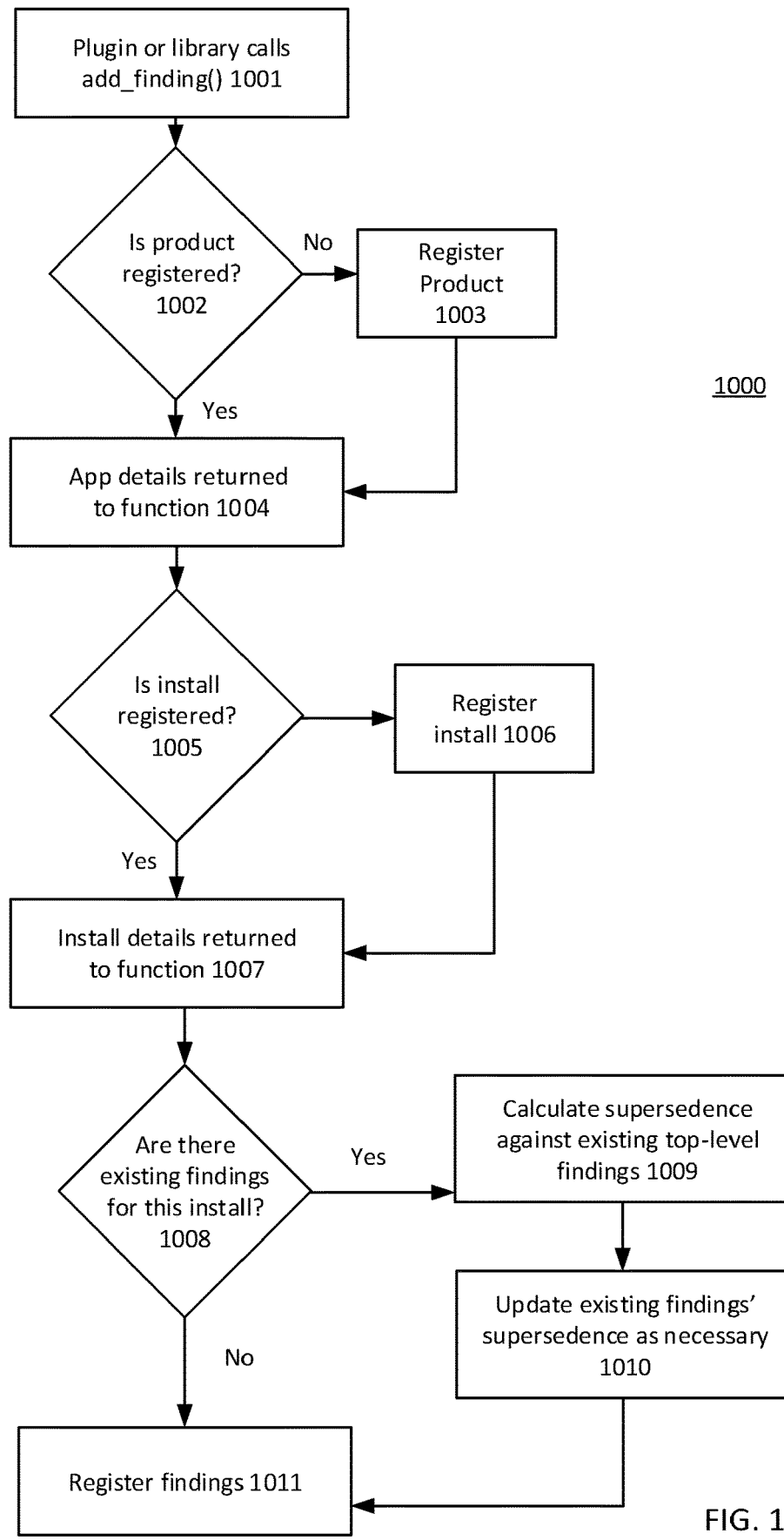
FIG. 10 illustrates a process which is an example implementation of the process of FIG. 3 in accordance with another embodiment of the disclosure.

The process for adding a finding 1000 according to one implementation is detailed in FIG. 10 beginning with a plugin or library calling a function at 1001 to add a finding to a database. The process 1000 of FIG. 10 is another example implementation of the process of FIG. 3 in accordance with another embodiment of the disclosure. In particular, the system scanner, plugin, or library may call the function add_finding( ). The function then determines at 1002 if the product is registered with the system; if not, the product is registered at 1003 before continuing. After determining the product or application is registered, the details (e.g. version) of the application are returned to the function at 1004. The function then checks if this install of the application is registered, and if not, the system registers the install at 1006. Once the install is registered, the install details are returned to the function at 1007.

The function and/or system then checks, at 1008, if there are any existing findings for that product/install. If not, the findings to be added may be registered at 1011. If there are existing findings, the function may calculate the supersedence of the findings to be added against the top-level findings in the database tree at 1009. The existing findings may also be updated or re-sorted as a part of this calculation as necessary at 1010. After the findings tree is corrected and supersedence is determined, the process may continue on to register any applicable findings at their appropriate location at 1011. The registration of the findings at 1011 may include referencing the product and install as well as supersedence if applicable. In particular, the finding may be inserted into an appropriate level of the finding tree for that product and/or install.

Figure 11:
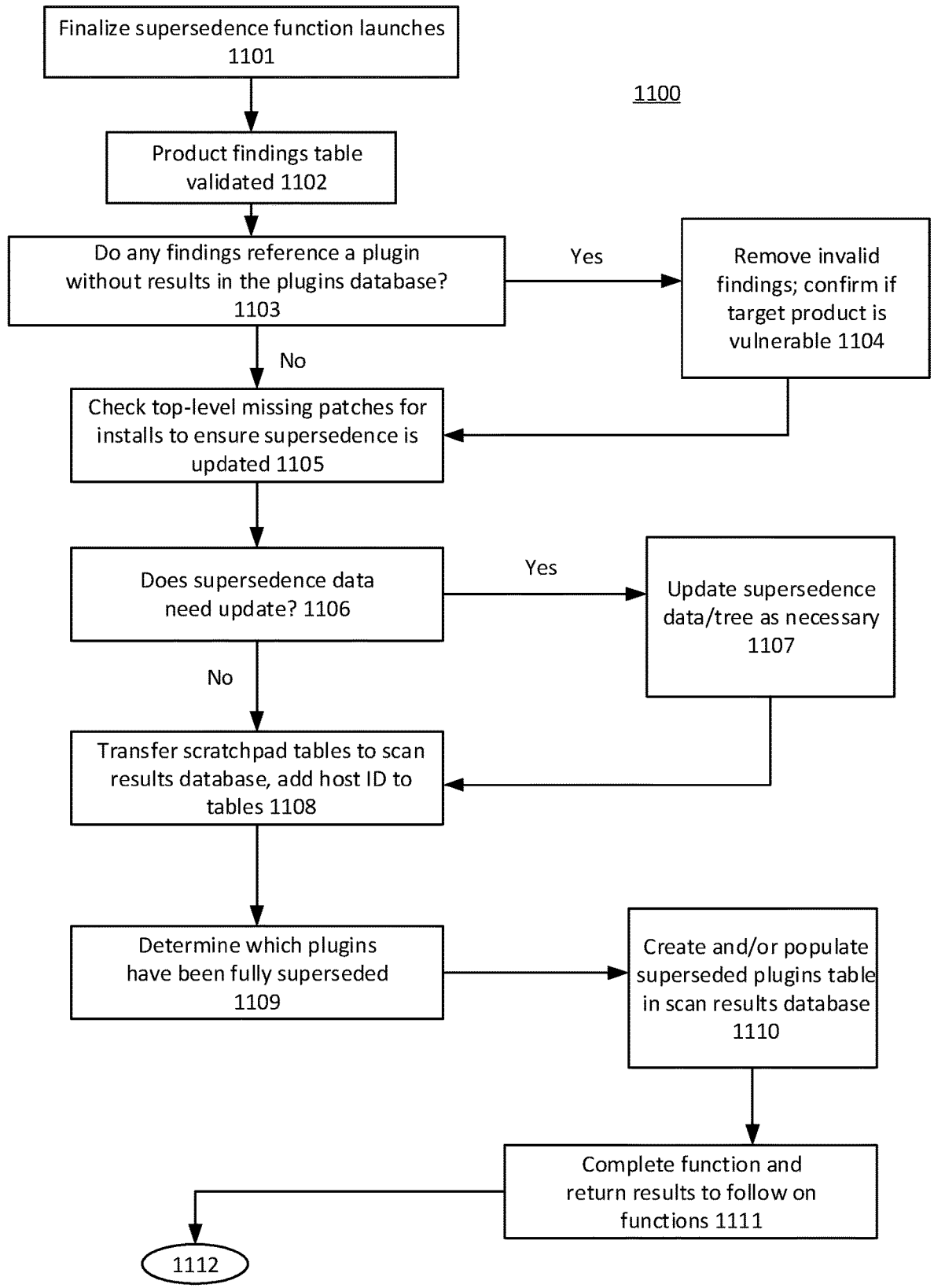
FIG. 11 illustrates a process which is an example implementation of the process of FIG. 3 in accordance with another embodiment of the disclosure.
Figure 12:
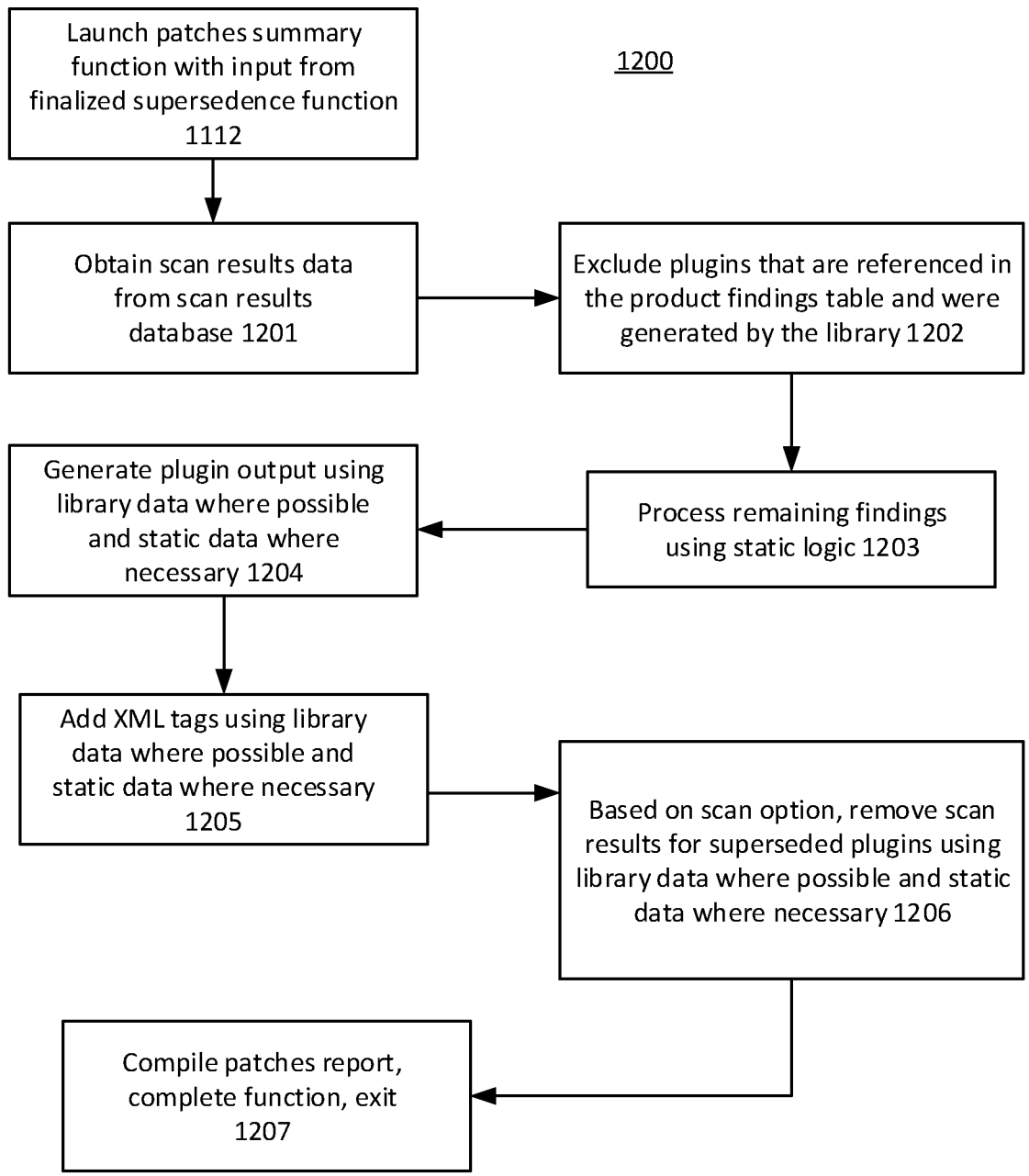
FIG. 12 illustrates a process which is an example implementation of the process of FIG. 3 in accordance with another embodiment of the disclosure.

The flow of information illustrated in FIG. 11 is a process 1100 to finalize the supersedence findings and the process continues to FIG. 12 where a patch report is ultimately generated. The process 1100 illustrates the many checks and controls needed for verifying supersedence of patches even after supersedence has been checked by the add findings function as in FIG. 10. The processes 1100-1200 of FIGS. 11-12 are example implementations, of the process of FIG. 3 in accordance with another embodiment of the disclosure.

At 1101, the finalization of supersedence function launches (e.g. finalize_supersedence.nbin) and begins, at 1102, by operating on the product findings table to validate the entries. These product findings may be the entries added in the process 1000 of FIG. 10. As a first check at 1103, the function may determine if any of the product findings reference a plugin that does not have results in the plugins database.

If so (yes), the function or system operates to remove the invalid findings at 1104. If the plugin did not produce output (i.e., there are no invalid findings), then the logic after the version check may determine that the target software was not vulnerable or in need of patching. The function then may move to a check of top-level missing patches, at 1105, for each installation to ensure supersedence is up to date. The system or function then may confirm at 1106 if supersedence needs to be updated or not. If not (no), then the function may copy the data tables in the scratchpad database 804 that were generated by the plugins to the scan results database 807 at 1108 and adds the host id tag/field to the tables. If supersedence is determined to need updating at 1106, then at 1107, the system may update supersedence data as necessary and continue to the copy step 1108.

The process 1100 then continues to analyze the scan results data. At 1109, the function may determine which plugins have been superseded; and then at 1110 may create and/or populates a superseded_plugins table in the scan results database 807. At this point at 1111, the function finishes (e.g. finalize_supersedence.nbin) and may pass on the superseded plugins along with the scan data to another function 1112 to generate a patch report.

At 1112 in FIG. 12, a function to generate a patch report from the scan results data and the plugin supersedence data is launched (e.g. patches summary.nbin). The function may begin by retrieving or getting the scan results data from the scan results database 807 at 1201. The process then continues at 1202 by excluding any plugins that are referenced in the product findings table generated by a library of asset-specific metadata as generated through the process of FIG. 5 (second embodiment). The remaining findings may be processed, at 1203, using static logic associated the static metadata generated through the process of FIG. 6 (third embodiment). The function or system at 1204 may generate plugin output using the library data where possible and the static data where necessary. At 1205, extendable markup language (XML) tags using library data may be added where possible and using static data where necessary. Based on the scan option, the system or function at 1206 may remove scan results for superseded plugins using library data where possible and using static data where necessary. The remaining data is then output to the patches report and the function exits at 1207.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD- ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of operating a security auditing component configured to facilitate remediation of enterprise network security issues, comprising:
    obtaining a solution set that is based upon a security audit of an enterprise network, the solution set characterizing a set of solutions associated with a set of security issues associated with one or more assets of the enterprise network;
    appending one or more solutions in the solution set with asset-specific metadata for at least one asset of the one or more assets, the asset-specific metadata including information specifying one or more missing patches or updates associated with the at least one asset;
    detecting that the solution set can be condensed into a condensed solution set that mitigates the set of security issues to the same degree as the solution set, the detection being based at least in part upon (i) one or more rules applied to one or more solution texts and/or (ii) the asset-specific metadata (iii) and/or static metadata;
    condensing, based on the detecting, the solution set into the condensed solution set by combining two or more subsets of related solutions and/or filtering the solution set to remove one or more subsets of redundant or superseded solutions; and
    transmitting, to a display component, a report that comprises at least one security issue and at least one corresponding solution based on the condensed solution set.

2. The method of claim 1,
    wherein the obtaining the solution set is based on the security auditing component performing the security audit of the enterprise network, or
    wherein the obtaining the solution set is from another component that performs the security audit.

3. The method of claim 1, wherein the detection is based at least in part on the one or more rules.

4. The method of claim 1, wherein the detection is based at least in part on the asset-specific metadata.

5. The method of claim 1, wherein the condensing comprises combining the two or more subsets of related solutions.

6. The method of claim 5, wherein the two or more subsets of related solutions are associated with at least one common security issue from the set of security issues.

7. The method of claim 1, wherein the condensing comprises filtering the solution set to remove the one or more subsets of redundant or superseded solutions.

8. The method of claim 1, further comprising:
    wherein the detection is based at least in part upon the appended asset-specific metadata.

9. The method of claim 8, wherein the asset-specific metadata further comprises:
    information gathered during the security audit,
    information identifying an installation targeted by the one or more solutions, or
    any combination thereof.

10. The method of claim 1, further comprising:
    appending one or more solutions in the solution set with the static metadata,
    wherein the detection is based at least in part upon the static metadata.

11. A security auditing component facilitating remediation of enterprise network security issues, the security auditing component comprising:
    memory; and
    at least one processor coupled to the memory,
    wherein the at least one processor and the memory are configured to:
        obtain a solution set that is based upon a security audit of an enterprise network, the solution set characterizing a set of solutions associated with a set of security issues associated with one or more assets of the enterprise network;

append one or more solutions in the solution set with asset-specific metadata for at least one asset of the one or more assets, the asset-specific metadata including information specifying one or more missing patches or updates associated with the at least one asset;

detect that the solution set can be condensed into a condensed solution set that mitigates the set of security issues to the same degree as the solution set, the detection being based at least in part upon (i) one or more rules applied to one or more solution texts and/or (ii) the asset-specific metadata and/or (iii) static metadata;

condense, based on the detecting, the solution set into the condensed solution set by combining two or more subsets of related solutions and/or filtering the solution set to remove one or more subsets of redundant or superseded solutions; and transmit, to a display component, a report that comprises at least one security issue and at least one corresponding solution based on the condensed solution set.

12. The security auditing component of claim 11,
wherein the at least one processor and the memory are configured to obtain the solution set based on the security auditing component performing the security audit of the enterprise network, or
wherein the at least one processor and the memory are configured to obtain the solution set from another component that performs the security audit.

13. The security auditing component of claim 11, wherein the detection is based at least in part on the one or more rules.

14. The security auditing component of claim 11, wherein the detection is based at least in part on the asset-specific metadata.

15. The security auditing component of claim 11, wherein the at least one processor and the memory are configured to condense the solution set by combining the two or more subsets of related solutions.

16. The security auditing component of claim 15, wherein the two or more subsets of related solutions are associated with at least one common security issue from the set of security issues.

17. The security auditing component of claim 11, wherein the at least one processor and the memory are configured to condense the solution set by filtering the solution set to remove the one or more subsets of redundant or superseded solutions.

18. The security auditing component of claim 11,
wherein the detection is based at least in part upon the appended asset-specific metadata.

19. The security auditing component of claim 18, wherein the asset-specific metadata further comprises:
information gathered during the security audit,
information identifying an installation targeted by the one or more solutions, or
any combination thereof.

20. The security auditing component of claim 11,
wherein the at least one processor and the memory are further configured to append one or more solutions in the solution set with the static metadata,
wherein the detection is based at least in part upon the static metadata.

21. A non-transitory computer-readable medium storing computer-executable instructions for a security auditing component configured to facilitate remediation of enterprise network security issues, the computer-executable instructions comprising:
one or more instructions causing the security auditing component to obtain a solution set that is based upon a security audit of an enterprise network, the solution set characterizing a set of solutions associated with a set of security issues associated with one or more assets of the enterprise network;
one or more instructions causing the security auditing component to append one or more solutions in the solution set with asset-specific metadata for at least one asset of the one or more assets, the asset-specific metadata including information specifying one or more missing patches or updates associated with the at least one asset;
one or more instructions causing the security auditing component to detect that the solution set can be condensed into a condensed solution set that mitigates the set of security issues to the same degree as the solution set, the detection being based at least in part upon (i) one or more rules applied to one or more solution texts and/or (ii) the asset-specific metadata and/or (iii) static metadata;
one or more instructions causing the security auditing component to condense, based on the detecting, the solution set into the condensed solution set by combining two or more subsets of related solutions and/or filtering the solution set to remove one or more subsets of redundant or superseded solutions; and
one or more instructions causing the security auditing component to transmit, to a display component, a report that comprises at least one security issue and at least one corresponding solution based on the condensed solution set.

22. The non-transitory computer-readable medium of claim 21,
wherein the one or more instructions causing the security auditing component to obtain cause the security auditing component to obtain the solution set based on the security auditing component performing the security audit of the enterprise network, or
wherein the one or more instructions causing the security auditing component to obtain cause the security auditing component to obtain the solution set from another component that performs the security audit.

23. The non-transitory computer-readable medium of claim 21, wherein the detection is based at least in part on the one or more rules.

24. The non-transitory computer-readable medium of claim 21, wherein the detection is based at least in part on the asset-specific metadata.

25. The non-transitory computer-readable medium of claim 21, wherein the one or more instructions causing the security auditing component to condense cause the security auditing component to condense the solution set by combining the two or more subsets of related solutions.

26. The non-transitory computer-readable medium of claim 25, wherein the two or more subsets of related solutions are associated with at least one common security issue from the set of security issues.

27. The non-transitory computer-readable medium of claim 21, wherein the one or more instructions causing the security auditing component to condense cause the security auditing component to condense the solution set by filtering the solution set to remove the one or more subsets of redundant or superseded solutions.

28. The non-transitory computer-readable medium of claim 21,
  wherein the detection is based at least in part upon the appended asset-specific metadata.

29. The non-transitory computer-readable medium of claim 28, wherein the asset-specific metadata further comprises:
  information gathered during the security audit,
  information identifying an installation targeted by the one or more solutions, or
  any combination thereof.

30. The non-transitory computer-readable medium of claim 21, further comprising:
  one or more instructions causing the security auditing component to append one or more solutions in the solution set with the static metadata,
  wherein the detection is based at least in part upon the static metadata.

* * * * *